(12) United States Patent
Cappelle et al.

(10) Patent No.: US 9,528,275 B2
(45) Date of Patent: Dec. 27, 2016

(54) FLOOR PANEL

(75) Inventors: Mark Cappelle, Staden (BE); Pieter Devos, Koolskamp (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 13/876,799

(22) PCT Filed: Sep. 26, 2011

(86) PCT No.: PCT/IB2011/054223
§ 371 (c)(1),
(2), (4) Date: Mar. 28, 2013

(87) PCT Pub. No.: WO2012/049577
PCT Pub. Date: Apr. 19, 2012

(65) Prior Publication Data
US 2013/0192158 A1   Aug. 1, 2013

Related U.S. Application Data

(60) Provisional application No. 61/426,583, filed on Dec. 23, 2010.

(30) Foreign Application Priority Data

Oct. 12, 2010 (BE) .................................... 2010/0602
Dec. 2, 2010 (BE) .................................... 2010/0719
(Continued)

(51) Int. Cl.
*E04F 15/02* (2006.01)
*E04F 13/08* (2006.01)
(Continued)

(52) U.S. Cl.
CPC ................. *E04F 15/02* (2013.01); *B32B 7/02* (2013.01); *B32B 7/12* (2013.01); *B32B 21/02* (2013.01);
(Continued)

(58) Field of Classification Search
CPC ............. E04F 2201/027; E04F 2201/02; E04F 2201/021;E04F 2201/023; E04F 2201/028; E04F 2201/01; E04F 2201/0107; E04F 2201/0115; E04F 2201/0123; E04F 2201/013; E04F 2201/0133; E04F 2201/0146; E04F 2201/0153; E04F 2201/0161; E04F 15/02; E04F 15/02005; E04F 15/02011; E04F 15/02022; E04F 15/02033; E04F 15/02038; E04F 13/0889; E04F 13/0892; E04F 13/0894; E04F 13/0801; E04F 13/0866; E04F 13/18
(Continued)

(56) References Cited

U.S. PATENT DOCUMENTS 6,647,690 B1 * 11/2003 Martensson .................... 52/601
8,516,767 B2 * 8/2013 Engstrom .................... 52/591.1
(Continued)

FOREIGN PATENT DOCUMENTS

DE       10237397 A1    2/2004
DE   102007062430 B3    7/2009
(Continued)

OTHER PUBLICATIONS

International Search Report from corresponding PCT Application No. PCT/IB2011/054223 dated May 15, 2012.
(Continued)

*Primary Examiner* — Jessica Laux
(74) *Attorney, Agent, or Firm* — Workman Nydegger

(57) ABSTRACT

A floor panel having two opposite edges including coupling parts with a configuration that allows the coupling parts to be brought into each other by a downward movement. The coupling parts allow locking in the plane of the panels and perpendicular to the edges by way of locking parts in the form of hook-shaped parts. In a coupled condition, the locking parts have contact surfaces which engage one
(Continued)

behind the other. The contact surfaces, when viewed in a top view of the panel, globally extend in one or more directions different from the direction of the upper edges.

16 Claims, 9 Drawing Sheets

(30) Foreign Application Priority Data

Dec. 22, 2010 (BE) .................................... 2010/0749
Jul. 4, 2011 (BE) .................................... 2011/0418

(51) Int. Cl.
| | |
|---|---|
| *B32B 7/02* | (2006.01) |
| *E04F 13/18* | (2006.01) |
| *E04F 15/10* | (2006.01) |
| *B32B 7/12* | (2006.01) |
| *B32B 21/02* | (2006.01) |
| *B32B 37/10* | (2006.01) |
| *B32B 37/15* | (2006.01) |
| *B44C 1/10* | (2006.01) |
| *B44C 5/04* | (2006.01) |
| *B32B 38/00* | (2006.01) |

(52) U.S. Cl.
CPC ............. *B32B 37/10* (2013.01); *B32B 37/153* (2013.01); *B44C 1/10* (2013.01); *B44C 5/043* (2013.01); *E04F 13/0866* (2013.01); *E04F 13/0894* (2013.01); *E04F 13/18* (2013.01); *E04F 15/02038* (2013.01); *E04F 15/107* (2013.01); *B32B 38/145* (2013.01); *B32B 2307/718* (2013.01); *B32B 2309/02* (2013.01); *B32B 2309/105* (2013.01); *B32B 2310/0825* (2013.01); *B32B 2310/0831* (2013.01); *B32B 2317/16* (2013.01); *B32B 2327/06* (2013.01); *B32B 2419/04* (2013.01); *B32B 2607/00* (2013.01); *E04F 2201/0115* (2013.01)

(58) Field of Classification Search
USPC ............. 52/578, 582.1, 582.2, 586.1, 586.2, 52/589.1, 590.2, 590.3, 591.1, 59, 1.3, 52/591.4, 592.1, 592.2, 592.3
See application file for complete search history.

(56) References Cited

U.S. PATENT DOCUMENTS

| | | | |
|---|---|---|---|
| 2001/0034991 A1 | 11/2001 | Martensson et al. | |
| 2004/0016197 A1 | 1/2004 | Ruhdorfer | |
| 2008/0000186 A1* | 1/2008 | Pervan et al. | ............... 52/588.1 |

FOREIGN PATENT DOCUMENTS

| | | |
|---|---|---|
| DE | 202009004530 U1 | 7/2009 |
| DE | 102008021970 A1 | 11/2009 |
| EP | 1154090 A1 | 11/2001 |
| EP | 1229182 A1 | 8/2002 |
| WO | 9627721 A1 | 9/1996 |
| WO | 9747834 A1 | 12/1997 |
| WO | 0198604 A1 | 12/2001 |
| WO | 03012224 A1 | 2/2003 |
| WO | 2004003314 A1 | 1/2004 |
| WO | 2004048716 A1 | 6/2004 |
| WO | 2005003489 A1 | 1/2005 |
| WO | 2007141605 A2 | 12/2007 |
| WO | 2008116623 A1 | 10/2008 |
| WO | 2009033623 A1 | 3/2009 |
| WO | 2009116926 A1 | 9/2009 |
| WO | 2010142671 A1 | 12/2010 |
| WO | 2011001326 A2 | 1/2011 |

OTHER PUBLICATIONS

Search Report from corresponding Application No. BE201000749 dated Mar. 25, 2011.
Search Report from corresponding Application No. BE201000719 dated Sep. 27, 2011.
Search Report from corresponding Application No. BE201100418 dated Jun. 11, 2012.
Search Report from corresponding Application No. BE201000602 dated Nov. 9, 2012.

* cited by examiner

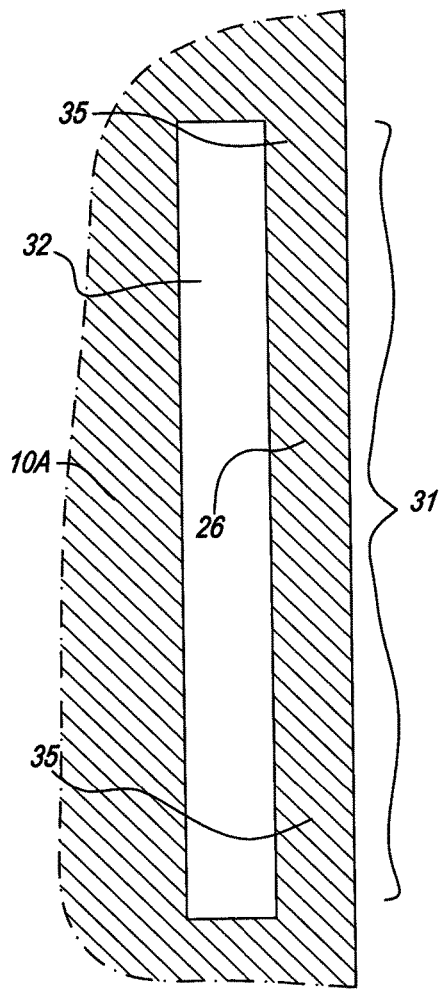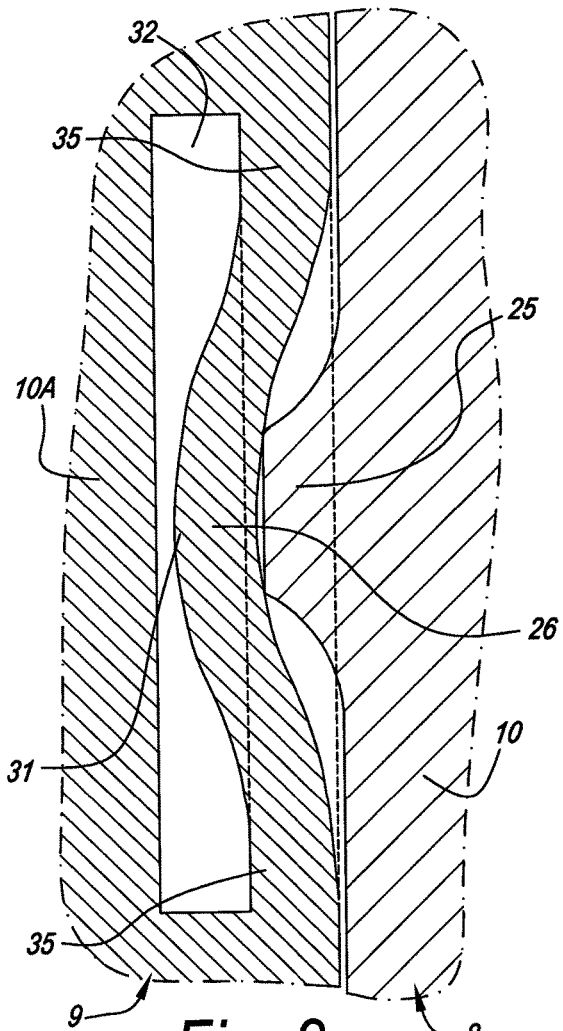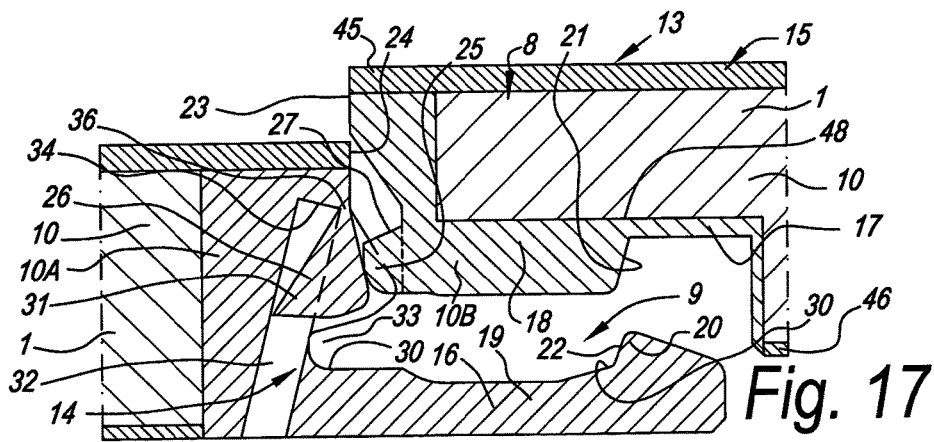

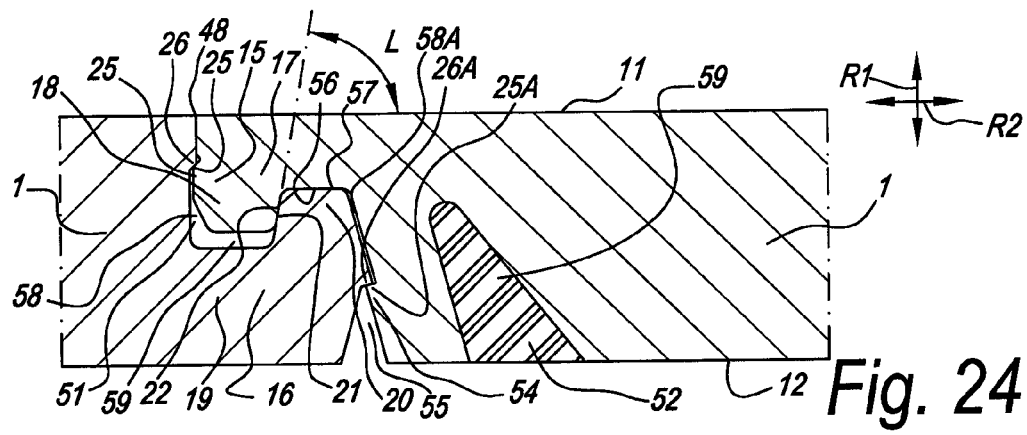
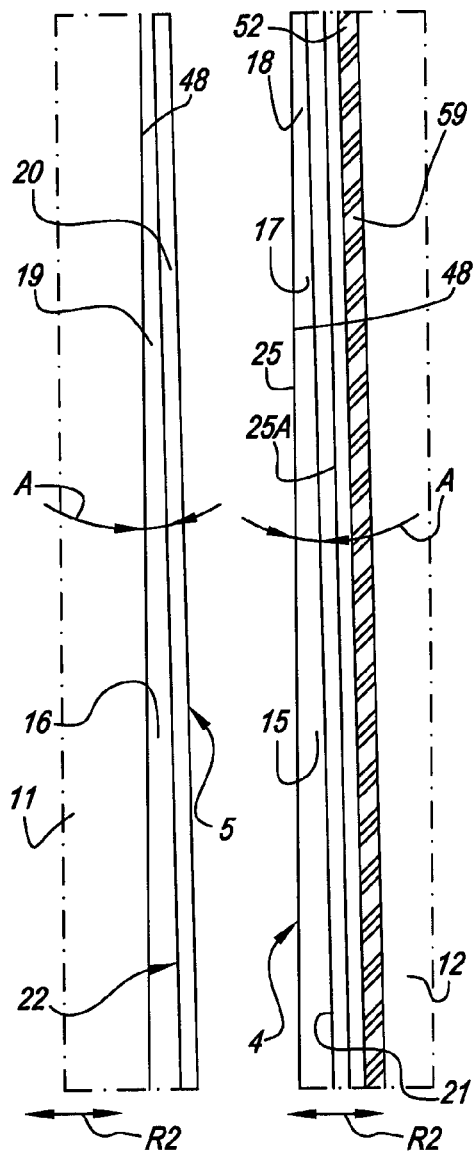
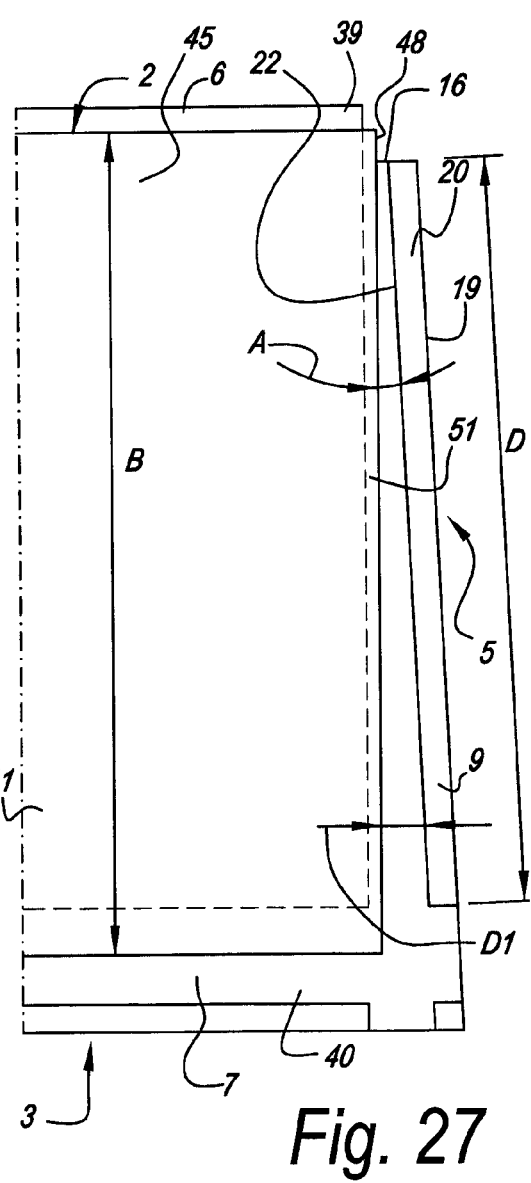
Fig. 24
Fig. 25  Fig. 26  Fig. 27

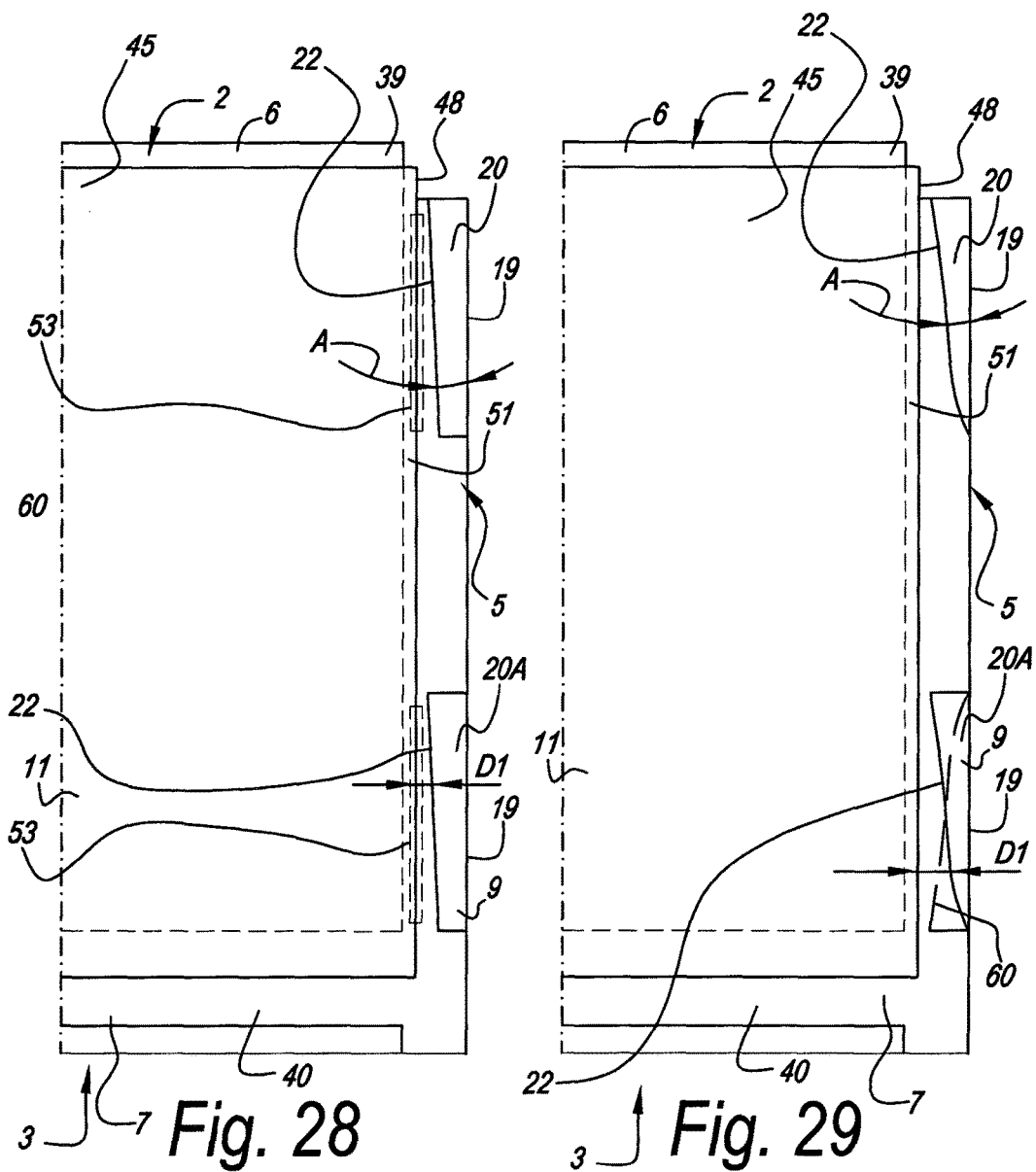

FLOOR PANEL

This application claims the benefit under 35 U.S.C. 119(e) to the U.S. provisional application No. 61/426,583 filed on Dec. 23, 2010.

BACKGROUND

Field of the Disclosure

This invention relates to a panel, and more particularly a floor panel.

In particular, it relates to a panel of the type wherein this panel comprises a core, an upper side, a lower side and at least two opposite edges; wherein coupling parts are provided on said two opposite edges; wherein said coupling parts have such a configuration that two of such panels can be coupled to each other by means of a downward movement of one of the panels in respect to the other, such that a locking is obtained in the plane of the panels and perpendicular to said edges, as well as perpendicular to the plane of the panels, wherein the coupling parts on said two edges comprise locking parts ensuring said locking in the direction perpendicular to the plane of the panels. Herein, this may relate, for example, to panels are concerned wherein at least one of these locking parts forms part of a flexible part extending along the respective edge and being bendable at least in the plane of the panel, as a result of joining of two of such panels.

Related Art

Panels of this type are known from WO 2008/116623 and WO 2009/033623 and have the feature that they can combine different advantageous characteristics in one and the same panel. In the panels from the above-mentioned patent documents, a flexible part is applied, which is made in one piece with the core. Hereby, a relatively inexpensive production is possible, as such coupling parts can be realized exclusively by means of machining treatments and no separate elements have to be provided in the edge. In that the panels, at two edges, are provided with coupling means allowing to couple such panels to each other by a downward movement, the panels, in the case of floor panels, when also being provided with an appropriate profile on the other edges, can be installed by means of using the user-friendly "angle-push" technique, wherein each newly to install panel is connected to the preceding row of panels by means of a turning technique, and wherein, as a consequence of the downward movement associated therewith, it can be coupled automatically to the preceding panel in the same row, by means of the coupling parts which have said flexible part. By, in this case, making use of a flexible element which is bendable in the plane of the panel and also substantially extends in the plane of the panel, said coupling parts allow to realize a so-called "push-lock" coupling in the core material. However, the core material of the panels of the herein above-mentioned patent documents shows a larger tensioning strength within its plane than perpendicular to its plane, which mostly is the case with wood composite board. This may possibly lead to tearing off of the flexible part from the remainder of the core.

According to the embodiments which are described in WO 2008/116623 and WO 2009/033623, the flexible part consists of a lip which is attached at its distal ends, however, for the rest, at the location of the zone where it is active as a locking part, is entirely made free all around, in order to provide the required flexibility. These known embodiments show the disadvantage that the flexible part made as a lip, in the coupled condition of two panels, can perform a considerable deformation transverse to the plane of the panels. This has as a consequence that, under certain irregular loads, it is impossible to ensure that the panels will not show any height differences at their decorative surfaces. When, for example, in the case of floor panels, a panel is heavily loaded directly next to its coupled edge, for example, by the leg of a heavy piece of furniture, said lip will bend in a plane transverse to the panels, whereby the heaviest-loaded panel possibly will sag deeper into the mostly applied elastically impressible underlying layer than the adjacent panel. Due to the fact that the locking part in the active zone is made entirely free all around, an undefined movement of the flexible part is obtained. In certain cases, for example, when dust particles or small protruding parts of the core material interfere with the movement of the flexible part, this may lead to difficulties when coupling the respective panels.

WO 2004/003314 and WO 2010/142671 also describe panels of the above-mentioned type. Herein, a "push-lock" coupling is realized in the core material of the panels. The panels from these documents comprise a core, an upper side, a lower side and at least two opposite edges, wherein the panels shows pertaining upper edges at said edges; wherein coupling parts are provided on said two opposite edges; wherein these coupling parts have such a configuration that the coupling parts of two such panels can be brought into each other by means of a downward movement of one of the panels in respect to the other, wherein, in the coupled condition of the panels, a locking in the plane of the panels and perpendicular to said edges, as well as perpendicular to the plane of the panels can be obtained, wherein said coupling parts for providing said locking in the plane of the panels and perpendicular to said edges are provided with hook-shaped parts, which, in the coupled condition, show contact surfaces which engage one behind the other. In the example of the mentioned patent documents, the contact surfaces extend in a direction parallel to the respective upper edge.

A disadvantage of the "push-lock" couplings of the state of the art, and then in particular when they are realized in the core material of the panel, is that they require a relatively large force for being assembled and/or that they are cumbersome to be disengaged again. Disengaging the coupling sometimes will be necessary when installing a floor covering consisting of such panels, when, for example, the length of a panel has to be adapted.

SUMMARY

In the first place, the invention envisages an alternative panel, which, according to various preferred embodiments, also offers a solution for the problems with the panels of the state of the art.

To this aim, the invention according to a first aspect relates to a panel, for example, a floor panel, wherein this panel comprises a core, an upper side, a lower side and at least two opposite edges, wherein the panel comprises pertaining upper edges at said edges; wherein coupling parts are provided at said two opposite edges; wherein these coupling parts have such a configuration that the coupling parts of two of such panels can be brought into each other by means of a downward movement of one of the panels in respect to the other, wherein in the coupled condition of the panels a locking in a horizontal direction, namely, in the plane of the panels and perpendicularly to said edges, as well as in a vertical direction, namely, perpendicularly to the plane of the panels, can be obtained, wherein said coupling parts for providing said locking in the plane of the panels and perpendicularly to said edges are provided with hook-shaped parts, which, in the coupled condition, show contact surfaces which engage one behind the other, with the characteristic that said contact surfaces, viewed in a top view of the panel, globally extend in one or more directions differing from the direction of said upper edges. In that the contact surfaces do no longer extend parallel to the direction of the pertaining upper edges, a number of new possibilities are obtained.

According to a new possibility, a simpler disassembly of panels coupled together can be obtained. Such possibility can be performed by applying contact surfaces which, in one or more portions, extend straight along the respective edge, wherein the distance between the pertaining upper edge and said one or more portions diminishes along this edge, respectively seen in the same direction, or possibly remains the same. Instead of being straight, one or more of these portions may also show a continuous curvature. In that the distance to the upper edge respectively diminishes in the same direction, a coming loose of the panels can be obtained with a limited shifting of the coupled panels along the respective edges.

Preferably, the panel is also provided with coupling means at the other pair of opposite sides, which coupling means allow coupling two such panels at these edges by providing the respective coupling means in each other, wherein these coupling means comprise a female coupling part and a male coupling part, and wherein, during coupling, the male coupling part has to be provided in the female coupling part. In such case, the aforementioned contact surfaces preferably extend such that the aforementioned distance respectively increases, viewed in the direction of the male coupling part towards the female coupling part. Such configuration of the contact surfaces allows that a panel can be dismounted from a row of floor panels without necessarily having to dismount other floor panels from the same row.

According to a second possibility, with a coupling of the respective edges, a more precise alignment of the other pair of edges can be obtained. This allows that, when installing a floor covering, in particular when installing the first and second rows thereof, it is possible to start more smoothly. This also allows applying certain installation methods more smoothly, for example, an installation method wherein a number of elongated floor panels are coupled at the short sides in a row and thereafter the obtained row is coupled to the long pair of edges of an already existing row. In such case, this preferably relates to the short pair of edges showing the not-parallel extending contact surfaces, such that, when coupling the short sides, a good alignment of the long edges is obtained.

Preferably, said hook-shaped parts comprise, on the one hand, an upper hook-shaped portion with a flange protruding laterally near the upper side of the panel, said flange being provided with a downward-directed part, and, on the other hand, a lower hook-shaped part with a flange protruding laterally near the lower side of the panel, said flange being provided with an upward-directed part, wherein said contact surfaces are formed between the aforementioned downward-directed part and the aforementioned upward-directed part. Herein, the upper hook-shaped part is intended for being provided in the lower hook-shaped part, more particularly with the downward-directed part in the recess adjacent to the upward-directed part. Preferably, the contact surfaces of the upward-directed part are directed to the pertaining upper edge.

Preferably, said contact surfaces, viewed in a cross-section perpendicularly to the respective edge, extend vertically, or inclined or curved from the top downward, in the direction of the edge provided with the lower hook-shaped part.

Preferably, the coupling parts at said two edges comprise coupling parts ensuring said locking in the direction perpendicular to the plane of the panels, wherein these locking parts show respective contact surfaces, which resist the coming loose of the upper hook-shaped part from the lower hook-shaped part. Preferably, this relates to contact surfaces which extend in a flat manner. The locking parts and pertaining contact surfaces can be performed according to different possibilities.

According to a first possibility for performing the locking parts and contact surfaces, they are substantially formed as a tongue and a groove, the latter being bordered by a lower and an upper lip. Preferably, said contact surfaces are situated on the upper side of said tongue and on the lower side of said upper lip.

According to a second possibility for performing the locking parts and contact surfaces, they are substantially formed by a lateral protrusion on the lower side of the edge with the upper hook-shaped part and an undercut on the lower side of the lower hook-shaped part, which cooperate with other. Preferably, said contact surfaces are situated on the upper side of the protrusion and on the lower side of the lower hook-shaped part. In this manner, for example, a configuration similar to that of the also above-mentioned documents WO 2004/03314 and WO 2010/142671 can be applied.

No matter how the locking parts and contact surfaces are realized, they preferably extend substantially parallel to the upper side of the panels. The possible deviation from the angle formed by the contact surfaces preferably is limited to a maximum of 60° and still better a maximum of 45° or 30°, such that still an acceptable locking in vertical direction can be obtained.

Preferably, the coupling parts, apart from the above-mentioned contact surfaces on the locking parts, also show one or more contact surfaces restricting the movement of the upper hook-shaped part towards the lower hook-shaped part. In the case of the above-mentioned first possibility, as well as in the case of the above-mentioned second possibility, these contact surfaces preferably are located, on the one hand, on the lower side of the upper hook-shaped part, or more particularly on the lower side of the downward-directed part thereof, or on the lower side of said tongue and, on the other hand, on the upper side of the lower hook-shaped part, or more particularly on the upper side of the recess and/or the upward-directed part thereof, or on the upper side of said lower lip of the groove.

Preferably, the contact surfaces which are active in the locking in horizontal direction, namely in a direction perpendicular to the respective edges and in the plane of the coupled panels, viewed in a top view of the panel, globally extend in a direction forming an angle with the upper edges, wherein this angle is located between 0.5° and 5°, or from 1° to 2°.

Preferably, these contact surfaces, viewed in a top view of the panel, globally extend on a straight line forming an angle with the upper edge of the panels. Preferably, they extend continuously or as good as continuously over this straight line.

As already mentioned above, the panel, according to the most preferred embodiments of the invention, is also provided with coupling means at the other pair of opposite sides, which coupling means allow coupling two of such panels at these edges by providing the respective coupling means in each other, wherein these coupling means comprise a female coupling part and a male coupling part, and wherein, during coupling, the male coupling part has to be provided in the female coupling part. Preferably, the female and the male coupling part at this pair of edges allow at least that they can be provided in each other by means of a turning movement around the edges to be coupled. In combination with the preferred embodiment mentioned here, said contact surfaces, cooperating in the locking in horizontal direction, viewed in a top view of the panel preferably extend from said male coupling part towards the female coupling part in a direction away from the edge which is provided with the lower hook-shaped part. By means of this embodiment, a particularly smooth disassembly can be obtained.

With the same point of view as in the case of the first aspect, the invention according to a second independent aspect also relates to a panel of the above-mentioned type, with the characteristic that the panel, at least at one of said opposite edges, comprises a synthetic edge part of a material different from the core material, wherein the coupling parts on said two edges comprise locking parts ensuring said locking in the direction perpendicular to the plane of the panels, wherein at least one of these locking parts forms part of a flexible part made in one piece with said synthetic edge part and extending along the respective edge and being bendable at least in the plane of the panel, as a result of the joining of two of such panels. Due to the fact that the flexible part is realized in a synthetic edge part, the material of this part can be chosen in view of a smooth coupling of the respective edges. The synthetic edge part preferably consists of a material with isotropic properties. This means that this material shows the same properties in all directions, at least as far as the tensile force and/or bending strength of this material are concerned. By applying such material, the risk of tearing off of the flexible part is minimized to a great extent. For the core material then, for example, indeed an anisotropic material can be applied, for example, a core material showing a larger tensile force within its plane then perpendicular to its plane, which mostly is the case with wood composite board, such as MDF or HDF.

The synthetic edge part preferably is substantially free from wood particles. This means that this edge part comprises less than 50 percent by weight of such wood particles. Still better, this edge part comprises less than 15 percent by weight of such particles, or this edge part even is free from wood particles. In that the edge part substantially is free from wood particles, this edge part can be provided with smoothly finished profiled edge surfaces, for example, without any small protruding parts, such that any interference of such parts during coupling will be minimized.

Preferably, on the respective edge by means of the synthetic edge part a water-repellent or waterproofing protection of the core material is realized.

As a material for the synthetic edge part, use can be made of a polyurethane, preferably obtained on the basis of a two-component system, such as on the basis of polyol and isocyanate. Polyurethane can adjusted to different hardnesses and is a flexible material in respect to production possibilities. For example, it is easy to cast. By means of such two-component system, a chemical adherence to wood particles, which possibly can be present in the substrate material, can be obtained. A chemical adherence is to be preferred above a mechanical adherence in respect to the strength thereof.

Preferably, said synthetic material of the edge part relates to a thermo-hardening synthetic material, for example, a material on the basis of polyurea, epoxy or polyurethane. Thermo-hardening materials do not require any extrusion process for processing them and allow smoother production processes. Herein, polyurethane is preferred as a result of the herein above-mentioned features thereof, and in particular the adjustable flexibility and casting ability thereof. The hardness of polyurea and epoxy is difficult to adjust to the requirements of the present invention. In such case, the hardness of polyurea and epoxy is of such kind that it is difficult to obtain a user-friendly and/or creak-free coupling. Moreover, polyurea cannot be cast, which complicates the applicability thereof in a mass production process.

Suitable synthetic material for realizing the synthetic edge parts are, for example, polyurethane elastomers, such as Elastocast by BASF, Baytec by BAYER or Rencast by HUNTSMAN. As a possible foaming filler, Expancel by Akzo Nobel can be applied.

It is clear that by a thermo-hardening material, a material is meant which, when heated up to a certain temperature, undergoes an at least partially irreversible chemical change, such as a cross-linking reaction. Preferably, a thermo-hardening material on the basis of a two-component system is used, such as so-called thermo-hardening urethane resin or TSU (ThermoSetting Urethane).

Preferably, at least the attachment of the edge part to the core material is obtained by hardening said synthetic material. Preferably, this herein relates to a direct attachment without intermediate material layers and/or substances, such as glue. Preferably, in combination therewith, also the attachment of the edge part to the possible top layer is obtained by hardening said synthetic material; preferably, this herein also relates to a direct attachment. The direct attachment of the synthetic material to the lower side of the top layer moreover may lead to an increased resistance against delaminating of such top layer. Namely, there is a risk of delamination, for example, when manufacturing panels, when the edges of the panel are provided with profiles by means of cutting treatments, such as milling operations. A risk of delamination also exists during installation, in particular when the panels during coupling chafe with their top layers against each other. Here, this risk is very pronounced, as the panels according to the invention are provided with coupling means at the respective edges, wherein these coupling means can be connected by means of a downward coupling movement. A risk of delamination also exists when using a floor covering which is composed of panels, and is present in a pronounced manner, for example, underneath the castors of office chairs.

Preferably, the panel comprises such synthetic edge part on both edges of a pair of opposite sides. Herein, the attachment, construction or dimensions of the respective edge parts do not necessarily have to be identical, however, preferably they are. They may, each individually, show the characteristics of one or more preferred embodiments of the second aspect. The invention thus also relates to all possible combinations of such characteristics.

Preferably, the synthetic material extends at least over 80 percent of the thickness of the core material. In this manner, the moisture sensitivity of possibly present core material on the edge, i.e. 20 percent of the thickness or less, also is limited. Preferably, the synthetic material extends over 90, 95% or more of the thickness of the core material, such that the moisture sensitivity is restricted even further.

Preferably, the synthetic edge part also extends at least over 80 percent, 90 percent, 95 percent or more of the contour of the profiled edge part present on the respective edge. Preferably, the complete edge of the core material is covered by the synthetic edge part, such that no exposed surfaces of the core material are present on the respective edge.

Preferably, the synthetic edge part extends at least over the entire thickness of the core material. In this manner, moisture sensitivity of possibly remaining core material on the respective edge is maximally excluded, and additional covering layers with water-repellent substance of remaining core material on the respective edge are not required.

Preferably, the synthetic material extends from the lower side of the panel into the possible top layer. By means of this embodiment, it is obtained in a reliable manner that no remaining core material is present directly below the top layer. In this way, negative effects, such as swelling of the edge, which can push up the top layer, can be avoided. If, contrary to the present preferred embodiment, a residual amount of core material is present between the edge part and the top layer, at least this portion of the core material preferably comprises a covering on the basis of a water-repellent substance. In this manner, edge swelling, which might push up the top layer, also can be avoided to a certain extent. Also possibly remaining core material below the edge part additionally can be sealed with such water-repellent substance.

Preferably, on all edges of the panel the core material is finished in a watertight manner. It is clear that on the edge or edges where the edge part of the invention is situated, this watertight finishing of the core material preferably is at least partially obtained by the presence of said edge part.

Preferably, said connection between the edge part and the core material extends over a boundary surface, which comprises partial surfaces extending transverse to the normal of the surface of the panel. Such boundary surface increases the strength of the connection between the core material and the synthetic edge part. Moreover, it is possible to save synthetic material by means of such configuration, in that said boundary surface then can follow the profile of the edges to a certain extent. Preferably, said boundary surface is performed such that it extends from the top downwards towards the bulk of the substrate material, or that an uppermost point of this boundary surface is situated closer to the edge of the top layer than a lowermost point of the boundary surface. Such configuration allows a smooth production of the panels.

Preferably, the panel comprises at least one support part which, with two of such coupled panels, when exerting a force in a direction opposed to said downward movement, forms a support against bending of the flexible part in a direction transverse to the plane of the coupled panels. By equipping the panel with such support part, the advantage is obtained that the flexible part can not, or at least less, bend in an undesired direction and that undesired height differences are made almost impossible, by which it can be guaranteed that under all conditions the panels will remain with their decorative side in the same plane.

Herein, said locking parts preferably are formed by parts which engage one behind the other by means of a snap movement, which allows a smooth coupling.

In a practical embodiment, said flexible part is made as a lip, whereas the other locking part, which is intended for cooperating therewith, is made as a tongue-shaped portion, which, during connecting two of such panels, causes an elastic bending in the lip, such that this tongue-shaped portion can get seated behind the lip by means of a snap movement.

Preferably, the support part is a portion of the synthetic edge part, which offers support to the flexible part, which support prevents that the flexible part, in the coupled condition, can bend in a direction transverse to the plane of the panels. By integrating the support part together with the flexible part into the synthetic edge part, such support point can be realized in a simple and accurate manner.

According to a particular preferred embodiment, the flexible part and the support part cooperate with each other by means of a releasable and/or deformable connection. An advantage thereof is that there is no play between the two parts. A very accurate and reliable coupling movement of the flexible part can be obtained.

According to another particular characteristic, the panel is characterized in that said flexible part is suspended such that, apart from a bending in the plane of the panel, it also performs a tilting movement and/or torsional movement. Such tilting movement offers the advantage that the locking part formed at the flexible part often performs a more controlled movement, which allows a better cooperation with the opposite locking part. Preferably, said deformable connection forms a hinge, around which the flexible part, seen in a cross-section through the hinge, can tilt or rotate.

According to another embodiment, the support part is formed by a fixed part of the panel, with a contact surface, along which the flexible part can be displaced. In this manner, a controlled displacement is possible and, thus, a bending in an undesired direction becomes impossible.

Practically seen, it is preferred that the flexible part substantially extends in the plane of the floor panel and comprises a contact surface which is intended for cooperating with a locking part of a coupled floor panel; that the flexible part, at least on the rear side, as well as on the contact surface, is free in respect to the core and/or the portion of the synthetic edge part situated internally within the panel; and that, in the direction of its lateral edge, at least at one of its two ends, it is in connection with the synthetic edge part. In the most preferred embodiment, the flexible part is at both ends in connection with the synthetic edge part.

It is clear that the support portion, in the coupled condition, preferably provides for a support function free from play. However, it is also clear that minor deviations may occur, wherein, however, a possible play in the support function preferably is kept smaller than 0.3 mm and still better smaller than 0.2 mm. By the play in the support function, it is meant inasmuch the flexible element can bend out transversely to the plane of the floor panel before coming into contact with a support portion especially provided for this purpose, at least in embodiments in which they are not in one piece.

Further, for the locking in the plane of the panels and perpendicular to said edges, preferably use is made of hook-shaped parts, which, in the coupled condition of two of such panels, engage behind each other. In a preferred embodiment, the aforementioned hook-shaped parts are made as a lower hook-shaped part with a flange protruding laterally near the lower side of the panel, said flange being provided with an upward-directed part, and an upper hook-shaped part with a flange protruding laterally near the upper side of the panel, said flange being provided with a downward-directed part, wherein said flexible part is formed on the edge comprising the lower hook-shaped part, in a material part of the synthetic edge part which is situated above this hook-shaped part. Such location of the flexible part offers a stable construction, as in this manner the flexible part is situated at a location where the surrounding panel material is thickest and the hook-shaped parts are not impaired by cuts, and moreover the locking part formed on the flexible part is located close to the upper edge of the panel.

It is clear that the panel can comprise a plurality of said flexible parts along the same edge.

The invention is particularly advantageous with embodiments where the core consists of a wood composite, more particularly a wood composite in the form of a board which extends according to the plane of the panel and which is created by pressing a mat of wood components which are bonded together by means of a binding agent. Namely, such wood composite allows manufacturing panels in an inexpensive manner, and thanks to the invention it is now possible to integrate so-called "push-lock" couplings in such panels in an effective manner by using a synthetic edge part in another material. The fact that the material of such boards can easily slide off according to planes parallel to the plane of the board, now, due to the presence of the synthetic edge part, has a reduced influence on the herein-described couplings.

In practice, the core preferably will consist of wood fiberboard, more particularly LDF (Low Density Fiberboard), MDF (Medium Density Fiberboard) or HDF (High Density Fiberboard). LDF or MDF are preferred, as this forms a cheaper filler material for the panel. In the case that on the other of the respective two opposite edges and/or on the other pair of opposite edges, use is made of coupling means which are made in one piece with the core material, then preferably MDF or HDF are used, such that sufficiently strong coupling parts can be provided on the edges, too. It is not excluded that such coupling parts or coupling means made In one piece are provided with a covering layer, for example, for obtaining a certain waterproof or water-repellent protection of the core material on the respective edges.

In the most practical form, the core as such is made monolithic, for example, in the form of a continuous MDF or HDF board, of course with the exception of the one or more edge parts present according to the invention.

The invention is also suited for being applied in so-called "engineered wood" panels, more particularly panels having a core consisting of a plurality of transverse-directed elements, for example, wooden laths or the like. By realizing such transverse-directed element in synthetic material at least at one end, a coupling part with a flexible part, as described herein above, can be integrated therein in an adequate manner, whereas for the other elements at choice use can be made of any appropriate material. For most of the other transverse-directed elements, thus, also inexpensive wood can be applied.

In the most preferred embodiment, such panel is characterized in that it is rectangular, thus, oblong or square, and that it is provided, on all four edges, with coupling parts allowing to perform a mechanical locking with surrounding panels, such that on all four edges a locking is obtained in the plane of the panels and perpendicular to said edges as well as perpendicular to the plane of the panels. This is of particular importance with floor panels, where, as known, no mutual height differences may occur around the entire circumference.

According to another particular feature, the panel is characterized in that it is provided, on two edges, with said coupling parts allowing that two of such panels can be coupled to each other by means of a downward movement of one of the panels in respect to the other, whereas the other two edges are provided with coupling parts allowing that two of such panels can be engaged in each other by means of a turning movement. This allows installing such panels according to the so-called, already set forth herein above "angle-push" technique.

Preferably, said flexible part, with the exception of possible cuts forming an essential part of a profile formed on the coupling parts, substantially is cut free by only a single cut, wherein this cut only extends over a part of the thickness of the panel at the location where the cut is situated. An advantage thereof is that the material of the panel is not weakened transversely and across, and moreover only one particular cut has to be realized.

Preferably, the flexible part is bordered at its rear side by a cut, wherein this cut has an open end and a closed end and/or bottom; and that the flexible part globally decreases in cross-section in the direction from the open end towards the closed end and/or the bottom. Such configuration allows a smooth movement of the flexible part.

Preferably, the flexible part is attached such that, during coupling, it performs only a rotational and/or torsional movement. As set forth above, such rotational and/or torsional movement offers the advantage that it can take place in a very controlled manner. Preferably, this is realized by making the above connection, at the location of the support part, uninterruptable, however, bendable, possibly such that it can be partially torn, by which a purely horizontal displacement, as known from WO 2008/116623 and WO 2009/033623, is completely excluded.

With the intention of better showing the characteristics of the invention, hereafter, as an example without any limitative character, some preferred embodiments are described, with reference to the accompanying drawings, wherein:

BRIEF DESCRIPTION OF THE DRAWING

FIGS. 7 and 8 represent cross-sections according to lines VII-VII and VIII-VIII in FIGS. 4 and 5, respectively;

FIG. 17, in a view similar to that of FIG. 5, represents another variant of the invention;

FIGS. 23 and 24 represent a variant, respectively in views similar to those of FIGS. 19 and 20;

FIGS. 25 and 26 represent views according to the arrows F25 and F26 represented in FIG. 23, respectively on the lower hook-shaped part and the upper hook-shaped part;

FIGS. 27 to 29, at a larger scale, represent a view on the area indicated by F27 in FIG. 18, however, for variants.

DETAILED DESCRIPTION OF VARIOUS EMBODIMENTS

In FIGS. 1 to 12, a panel 1, in this case a floor panel, according to the second aspect of the invention is represented. The panel 1 is rectangular and oblong and consequently has a pair of opposite long sides 2-3 and a pair of opposite short sides 4-5, which are determined by edges 6-7 and 8-9 formed at the panel.

The panel 1 further comprises a core 10, an upper side 11 and a lower side 12.

Figure 1:
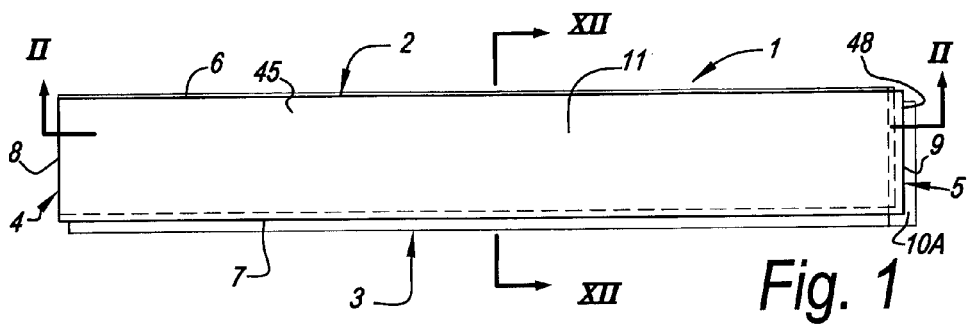
FIG. 1 in top plan view represents a panel, more particularly a floor panel, according to the second independent aspect of the invention.
Figure 2:
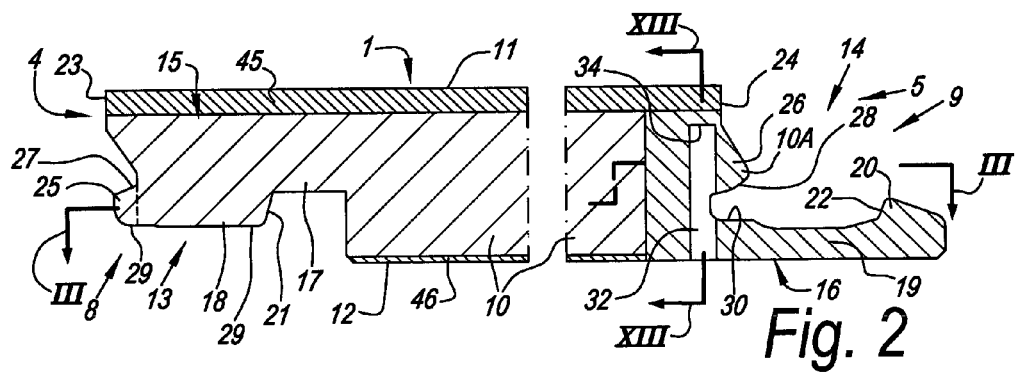
FIG. 2, at a larger scale, represents a view according to line II-II represented in FIG. 1.
Figure 3:
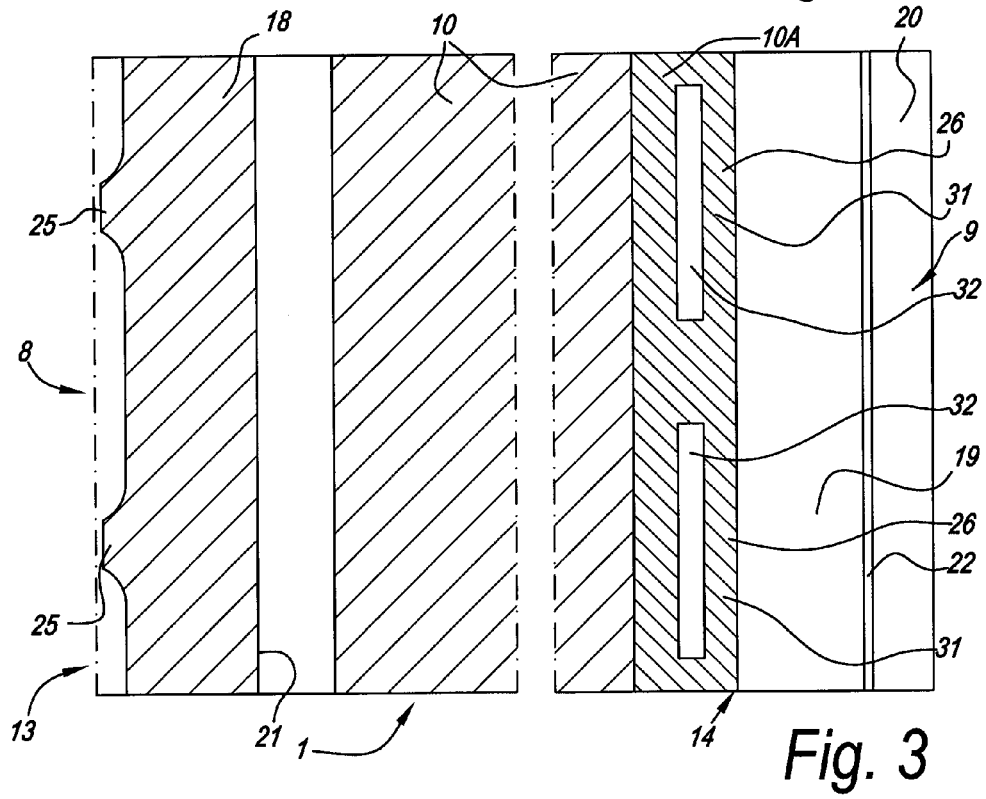
FIG. 3 represents a cross-section according to line in FIG. 2.
Figure 4:
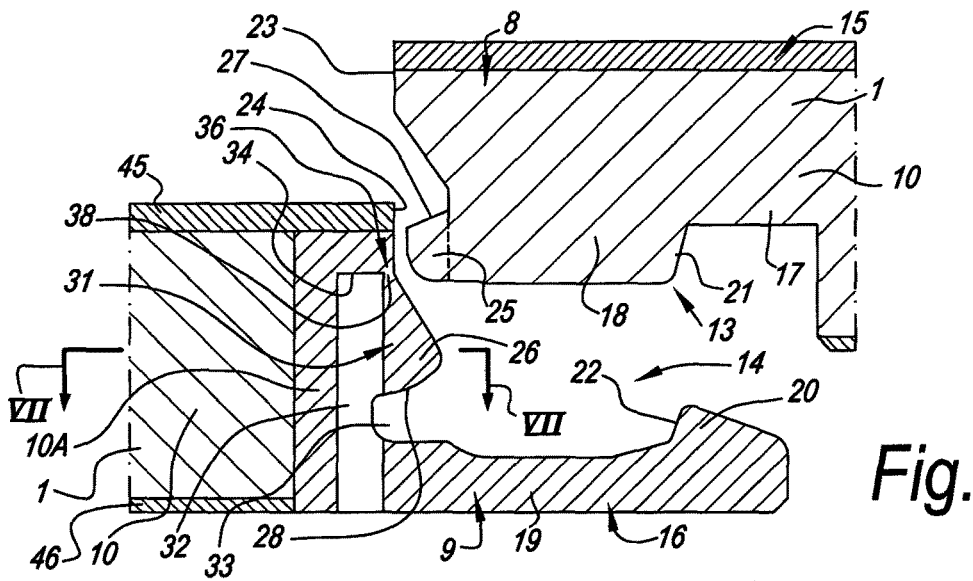
FIGS. 4 to 6 represent how two panels, such as those of FIG. 1, can be coupled to each other by means of a downward movement.
Figure 5:
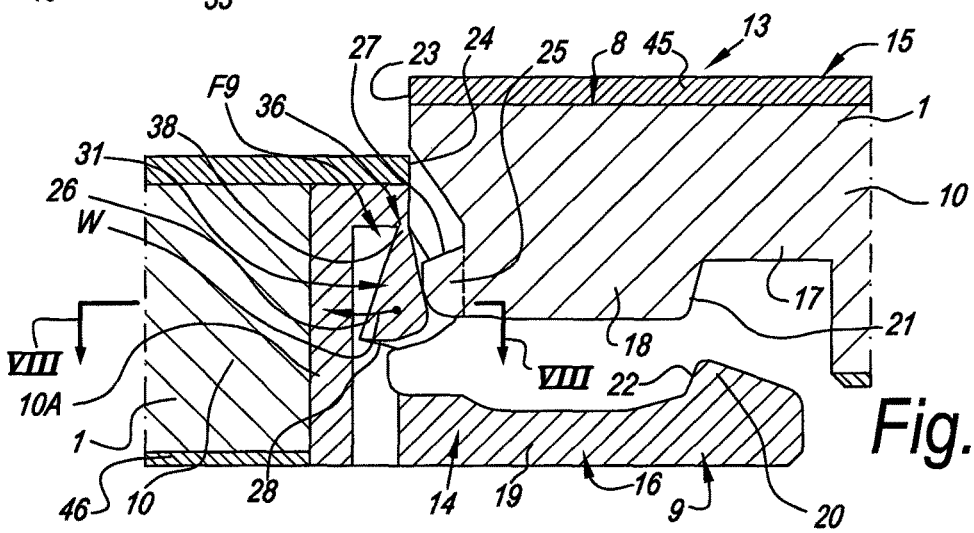
Figure 6:
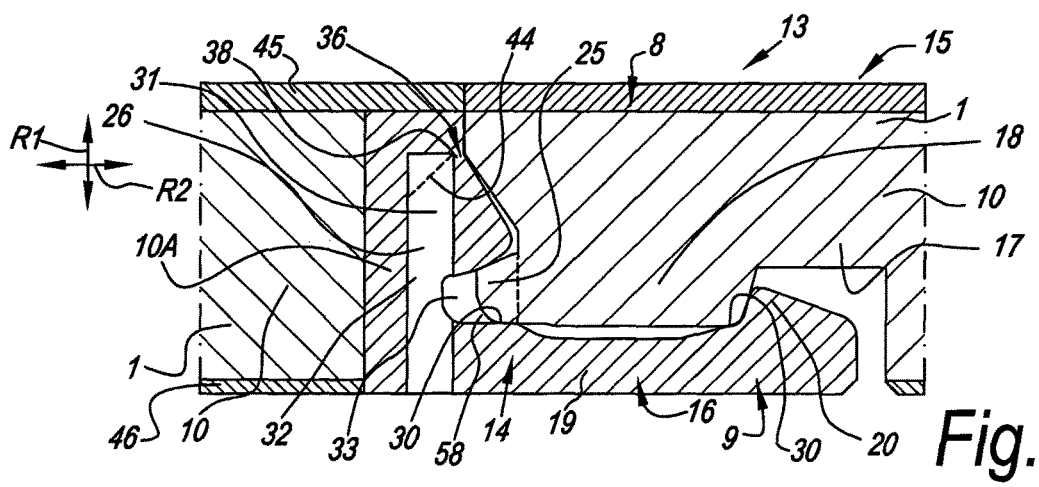

At the opposite edges 8-9, coupling parts 13-14 are provided, which have such a configuration that two of such panels can be coupled to each other at such edges by means of a downward movement of one of the panels 1 in respect to the other, for example, as illustrated in FIGS. 4 to 6. Also, these coupling parts 13-14 are configured such that in the coupled condition a locking is obtained in the plane of the panels 1 and perpendicular to said edges 8-9, as well as perpendicular to the plane of the panels 1, in other words, either in the directions R1 as well as R2 indicated in FIG. 6.

In order to obtain the locking in the plane of the panels 1 and perpendicular to said edges 8-9, thus, in this case to obtain that the coupled floor panels 1 are locked against horizontal drifting apart, the coupling parts 13-14 are provided with locking parts in the form of hook-shaped parts 15-16, which, in the coupled condition, engage behind each other. These hook-shaped parts 15-16 comprise an upper hook-shaped part 15 with a flange 17 protruding laterally near the upper side of the panel 1, said flange being provided with a downward-directed part 18, and a lower hook-shaped part 16 with a flange 19 protruding laterally near the lower side of the panel 1, said flange being provided with an upward-directed part 20. The parts 18 and 20 comprise contact surfaces 21-22 which, in the coupled condition of two of such panels 1, engage behind each other. In the direction towards each other, the panels 1 have contact surfaces 23-24 which are situated near their upper edges.

In order to obtain the locking perpendicular to the plane of the coupled panels, the edges 8-9 are provided with locking parts 25 and 26, with respective contact surfaces 27-28, which prevent that the hook-shaped parts 15-16 can become detached from each other. In the other direction, the mutual displacement is prevented in that the hook-shaped parts 15-16 come into mutual contact by means of one or more contact surfaces 29-30.

In the example, respectively on each of the edges 8-9 two locking parts 25, as well as two locking parts 26 are provided, distributed over the length of the respective edge. However, it is clear that according to not represented variants also only one locking part per edge could be used, or more than two per edge. At least one of these locking parts, in this case respectively at least the locking part 26, forms part of, or is formed by, a flexible part 31 realized in one piece with a synthetic edge part 10A present there, which flexible part extends along the respective edge 9 and is bendable at least in the plane of the panel, as the consequence of joining two of such panels, such that the locking parts 25-26 can engage behind each other by means of a snap movement. By the term "as a consequence of joining" is meant that during the joining movement a deformation manifests itself at least temporarily.

In the example, the synthetic edge part 10A extends over the entire length of the respective edge 5.

As represented in the example, and as can be seen more particularly in FIG. 8, such flexible part 31 preferably is performed as an elastically bendable lip.

In order to obtain such portion which is flexible, this portion for the major part is detached from the remainder of the material of the core. In the represented embodiment, this is realized by means of respectively a cut 32 at the rear side of the part 31, and a cut 33 which substantially may be a part of the coupling profile to be formed.

In this example, the cut 32 does not extend transverse through the panel, but up to a certain depth, and thus also has a most inwardly situated side or bottom 34.

The flexible part 31 substantially extends in the plane of the panel 1 and, at its ends 35, is in connection with the synthetic edge part 10A. In the present case, the actual core 10 of the panel 1 consists of a core material, which has a larger tensile force in its plane than perpendicular to its plane, which mostly is the case with wood composite board.

Each respective locking part 25 preferably is made as a tongue-shaped part, which, during connecting two of such panels 1, causes an elastic deformation in the lip-shaped part, such that this tongue-shaped part can be positioned behind the lip by means of a snap movement. In the example, each tongue-shaped part has a length L which is smaller than the length of the lip-shaped part, as can be seen in particular in FIG. 8.

According to a particular preferred characteristic of the invention, the panel 1 comprises at least per flexible part 31 a support part 36, which, with two of such coupled panels 1, when exerting a force in a direction opposed to said downward movement, forms a support against bending of the flexible part in a direction transverse to the plane of the coupled panels 1.

The support part 36 is situated at the height of the side of the flexible part 31 which is situated opposite to the locking side 37 of this flexible part.

The support part 36 is a part of the synthetic edge part 10A, which offers support to the flexible part 31, which support prevents that the flexible part can bend out in a direction transverse to the plane Of the panels, by which the panels no longer would remain co-planar.

In the represented example, the cooperation between the flexible part 31 and the support part 36 is performed by means of a releasable and/or deformable connection 38 between a movable portion of the flexible part and another part of the respective edge of the panel, which offers a permanent support.

It is noted that in the example, said flexible part 31 is suspended such that, apart from a bending in the plane of the panel, it can also perform a tilting movement and/or torsional movement W, as indicated in FIG. 5.

Figure 12:
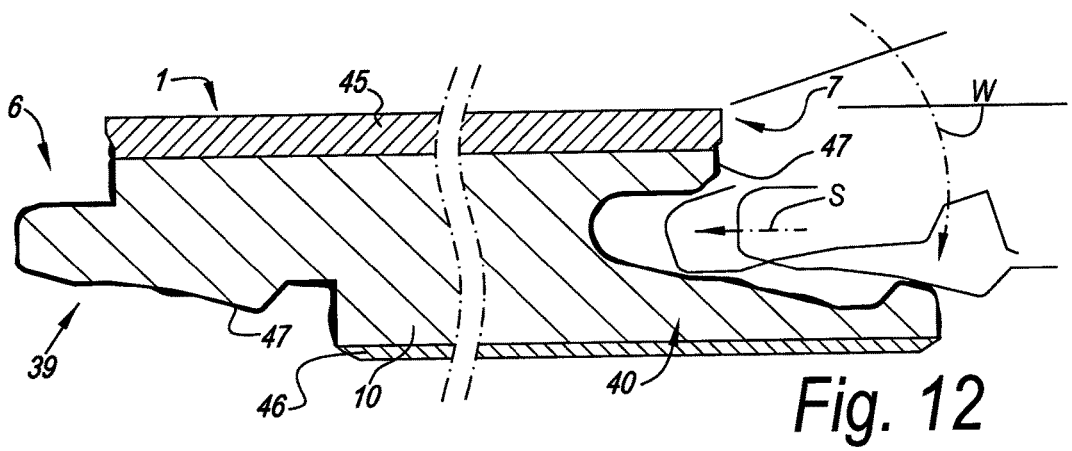
FIG. 12, at a larger scale, represents a cross-section according to line XII-XII in FIG. 1.

The example shows that in the case of oblong panels 1, it is preferred that the herein above-described coupling parts preferably are located at the short sides 4-5. At the other sides 2-3, too, as represented in FIG. 12, preferably coupling parts 39-40 are present, which allow making a mechanical locking with surrounding panels, such that at all four edges a locking is obtained in the plane of the panels and perpendicular to the aforementioned edges, as well as perpendicular to the plane of the panels. These coupling parts 39-40 can be of any kind. Preferably, however, they allow at least that two panels 1 can be engaged in each other at the respective sides 2-3 by means of a turning movement W. In this manner, such panels 1, when being installed in successive rows, can be installed very smooth by coupling such panel each time with a long side by means of a turning movement to the preceding row of panels and providing for, during turning down, that, as a consequence of the downward movement, as represented in FIGS. 4 to 6, automatically a connection is created between the short side of the new panel and the short side of the preceding panel installed in the same row.

The functioning of the connection at the short sides takes place in more detail as described below. When putting down a panel 1 to be coupled, the flexible part 31 is impressed by means of the locking part, as illustrated in FIGS. 5 and 8. When moving still further down, the flexible part 31 springs back, by which a locked condition is obtained, as illustrated in FIG. 6.

Figure 9:
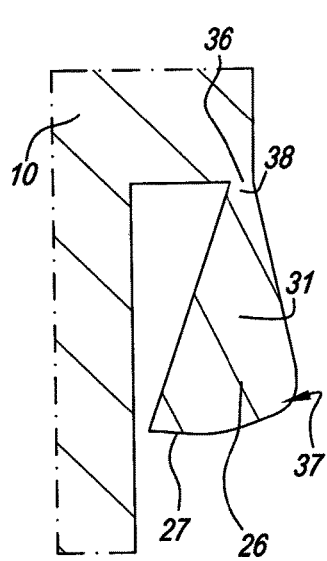
FIGS. 9 to 11, for a number of possible conditions, variants, respectively, represent the part indicated by F9 in FIG. 5.
Figure 10:
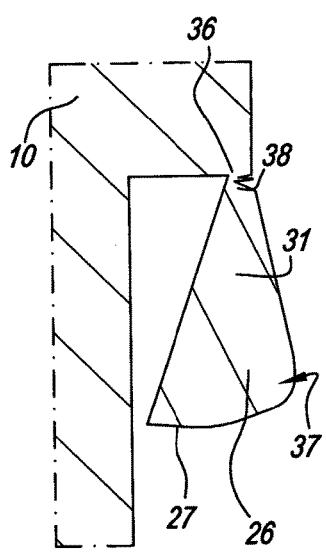
Figure 11:
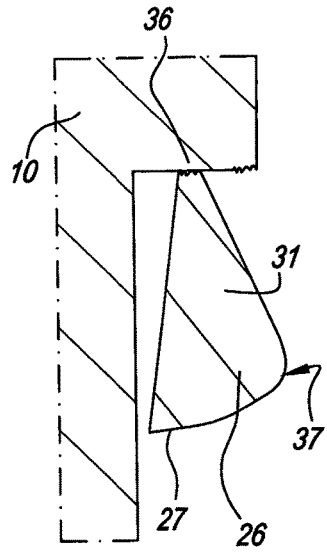

The deformation in the flexible part 31 can manifest itself in different manners, depending on the location in this part and the strength properties of the material of the edge part 10A, which will be explained herein below by means of a number of possibilities with reference to FIGS. 9 to 11. FIG. 9 shows only a bending in the connection 38. FIG. 10 shows a partial tearing at the location of the connection 38. In FIG. 11, the connection is totally interrupted, but the support part 36 still forms a support.

Figure 13:
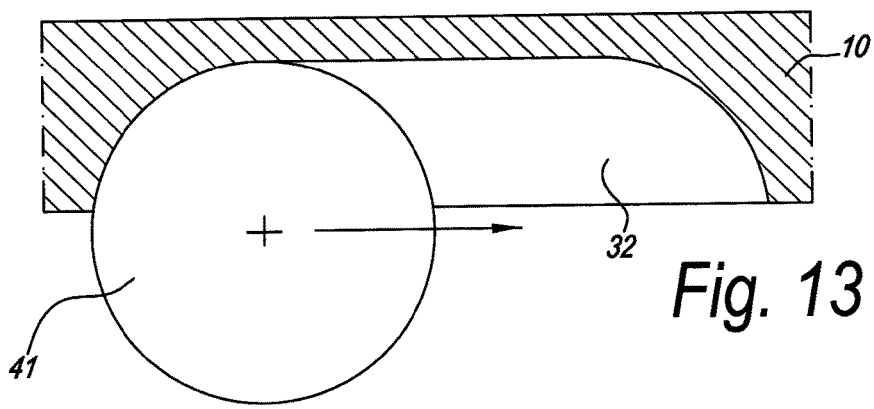
FIG. 13 schematically, in a cross-section according to line XIII-XIII in FIG. 2, represents how the represented recess can be provided in the panel.

In FIG. 13, it is also schematically represented how, for example, the cut 32 can be applied in the panel 1 by means of a rotating cutting tool 41.

Figure 14:
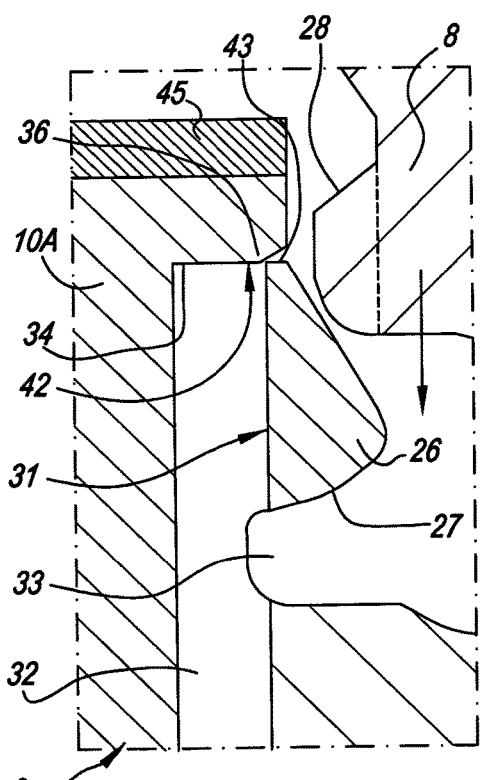
FIGS. 14 to 16 represent a part of a variant, for three different conditions.
Figure 15:
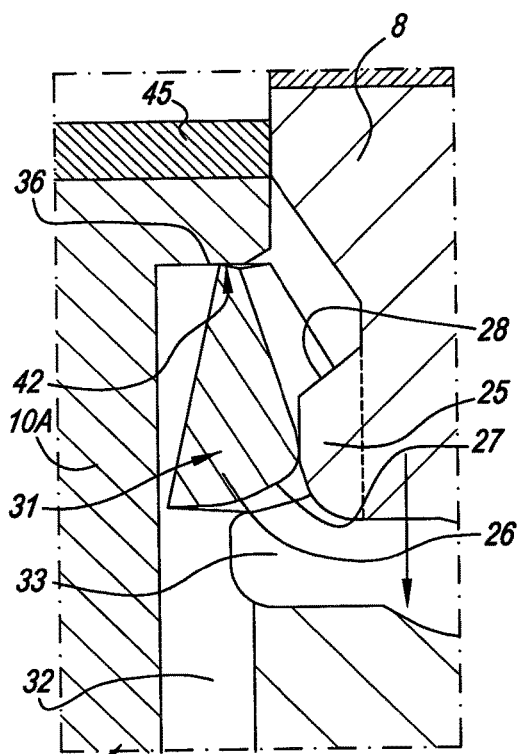
Figure 16:
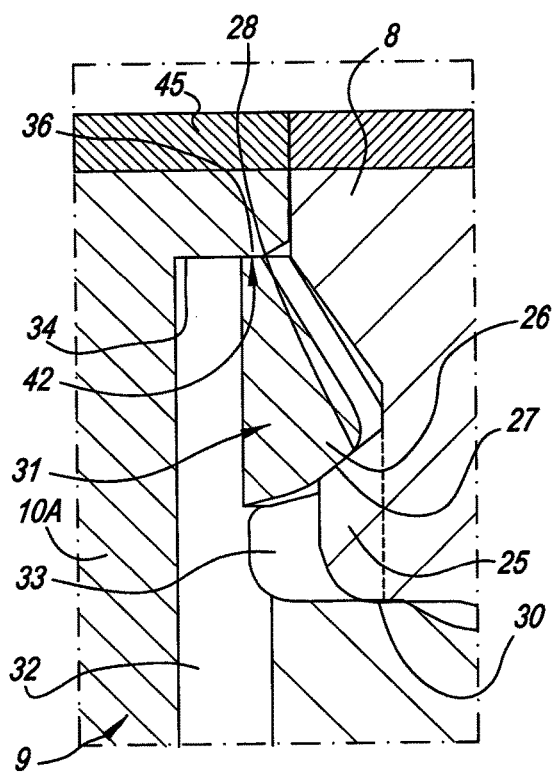

In FIGS. 14 to 16, a variant is represented, wherein the support part 36 is formed by a fixed portion of the panel 1, with a contact surface 41 along which the flexible part 31 can be displaced. The difference in comparison with the preceding embodiment is that the flexible part 31 already from the beginning is completely free from the support part 36, such as in the initial condition of FIG. 14. The configuration then further is such that, when deforming the flexible part 31 during coupling of two panels 1, first the flexible part 31 is moved with its edge, in this case upper edge 42, under the contact surface 41, as illustrated in FIG. 15, whereas this flexible part 31, in the final locked condition of FIG. 16, cannot move completely back to the original condition and remains making contact with the contact surface 41, by which the desired support remains obtained and ensured.

FIG. 17 represents another variant, wherein the cut 32 is not standing perpendicular on the plane of the panel, but is directed inclined, more particularly with an inclination in the direction as represented. This offers the advantage that the flexible part 31 can move more inward, whereas it still has a reasonable thickness.

It is clear that different variants are possible. In the example, both locking parts 25-26 are realized as portions which do not extend continuously over the length of the respective edges. According to a variant, the edge on which one of these locking parts is present in fact can be realized with a continuous profile, for example, by providing the tongue-shaped part on the flexible part, such analogous to the embodiment which is known from FIGS. 1 to 3 of WO 2008/116623.

In FIG. 6, with dashed line 44 a variant of the cut 32 is represented, with an inclined course of the bottom. Hereby, the risk of tearing towards the left can be reduced.

In the figures, the panels 1 are represented with a one-piece core 10. However, this does not necessarily have to be the case. The core 10 may be composed, for example, of a plurality of layers and/or parts, wherein at the respective edge then a different material is situated, which forms the synthetic edge part 10A.

Further, it is clear that the panels, irrespective according to which of the aforementioned aspects, certainly in the case of a floor panel, normally will be provided with a decorative layer on the upper side. On the lower side, too, possibly a backing layer can be provided. Herein, this may relate to any materials. A number of examples are: laminate composed of one or more layers, for example, of the DPL type (Direct Pressure Laminate) or HPL type (High Pressure Laminate); a decor printed directly on the panel, whether or not provided with additional top layers and/or additional underlying layers; veneer or a decorative layer formed of wood parts; vinyl, linoleum or the like; stone; cork or a product on the basis of cork; a carpet layer; a foil or film.

According to the most preferred embodiment of the present invention, the panel relates to a floor panel with a top layer 45 provided on the upper side 11 and a backing layer or underlying layer 46 provided on the lower side 12. Herein, said top layer 45 preferably comprises at least a motif and a situated there above transparent or translucent layer. Preferably, said underlying layer 46 or backing layer as well as said transparent or translucent layer comprise thermoplastic synthetic material, whereas said core 10 comprises thermo-hardening synthetic material. For the thermo-hardening synthetic material, preferably a synthetic material is chosen which hardens by means of a polycondensation reaction. The thermo-hardening synthetic material preferably is chosen from the list of melamine formaldehyde resin, urea formaldehyde resin, melamine urea formaldehyde resin and phenol-based resin. The thermo-hardening synthetic material can be present, for example, in the core material as a binding agent for particles of a board material, such as for binding of wood particles in wood particle board or wood fiberboard, LDF (Low Density Fiberboard), MDF (Medium Density Fiberboard) or HDF (High Density Fiberboard). Said thermoplastic synthetic material preferably relates to a vinyl-based synthetic material. Preferably, said top layer and/or said underlying layer or backing layer comprise PVC (PolyVinyl Chloride) or another vinyl compound, such as EVA (Ethylene VinylAcetate). Still better, said top layer and/or underlying layer or backing layer substantially consist of one or more of these synthetic materials, preferably substantially of PVC. Preferably, said transparent or translucent layer substantially consists of PVC and/or plasticizer.

Preferably, the core material has a density of more than 300 kilograms per cubic meter, and still better of more than 500 kilograms per cubic meter. The core material preferably has a thickness of four, five millimeters or more. The use of an actual core having a density of more than 500 kilograms per cubic meter allows profiling one or more edge parts of the core material for forming coupling means thereon, such as represented in FIG. 12 for the long pair of opposite sides 6-7. In this manner, the qualitative core material contributes to the locking of two of such floor panels 1, which are connected at their edges. Possibly, such profile can be provided with a covering layer 47 of moisture-repellent or sealing substance, such as is the case in the example of FIG. 12. To this aim, FIG. 12 represents coupling means 39-40, which in principle are formed in one piece with the core 10, however, are provided with such sealing covering layer 47. This covering layer 47 can have, for example, a global thickness of 0.05 to 0.3 millimeters. Preferably, for the water-repellent substance, polyurethane-based hot-melt glue is used.

Preferably, the core 10 or the core material consists of a single layer. However, it is not excluded that use could be made of a plurality of layers. According to a particular example thereof, said substrate consists of a MDF or HDF board material, above which a cork layer is provided. In such case, the cork layer is located between said motif and the substrate. Of course, also other layers may be situated between the cork layer and the motif, such as a possible back layer integrated in the top layer, which back layer will be described further herein below by means of a particular embodiment.

Preferably, said top layer is connected to the core material by means of a glue layer.

According to a preferred embodiment, said top layer and/or said underlying layer or backing layer comprise filler material, such as chalk or wood fiber. In the case of the top layer, such filler material preferably is concentrated underneath the motif, for example, in the possible back layer, which will be described further herein below by means of a particular embodiment.

According to a particular embodiment, said top layer as such is composed of at least a back layer, a motif or pattern provided thereon and a transparent or translucent wear layer. Said back layer preferably has a thickness which is 45 percent or more of the overall thickness of the top layer. Such back layer preferably consists of a vinyl compound or possibly a polyurethane compound, wherein preferably use is made of fillers, such as chalk. The synthetic material applied therein preferably comprises recycled synthetic material or substantially consists thereof. Preferably, the back layer is realized with a higher density than the wear layer. Amongst others, for this the application of filler materials in the back layer is of interest. For the motif or pattern, use can be made of a printed material sheet, such as a synthetic material film, or of a print performed directly on the substrate. For said translucent or transparent wear layer, preferably use is made of a vinyl layer or polyurethane layer having a thickness of at least 0.2 millimeters and still better having a thickness of at least 0.3 millimeters. Preferably, this translucent or transparent layer is not made thicker than 1 millimeter. By means of a transparent layer of 0.25 to 0.7 millimeters, a wear resistance can be obtained which is comparable to that of laminate floor panels. The transparent or translucent layer can either be provided as a film, whether or not together with said printed film, or provided in liquid form and afterwards hardened on the substrate. Preferably, the transparent or translucent layer has a thickness corresponding to at least 25 percent of the overall thickness of the top layer. Preferably, said transparent or translucent top layer is free from hard mineral particles, such as aluminum oxide particles. According to the inventors, this is not necessary when the transparent layer has a thickness of at least 0.2 millimeters. With such thickness in fact already a wear resistance can be obtained of IP 2000 according to the standard for laminate floorings EN 13329. When with similar thicknesses, a higher wear resistance has to be obtained, preferably indeed use is made of hard particles.

Generally, when using thin transparent thermoplastic layers, namely, layers thinner than 0.5 millimeters or thinner than 0.35 millimeters, preferably indeed use is made of hard mineral particles, such as aluminum oxide, in the respective layer.

Optionally, the top layer can include a surface layer on the basis of a radiation-hardened translucent or transparent synthetic material layer, for example, on the basis of a UV-hardening substance. Such surface layer possibly may include hard mineral particles, such as aluminum oxide particles.

Preferably, the parts 18 and 20 are configured such, for example, made so low, that the panels at the edges 8-9 can engaged into each other not only by said downward movement, but also can be engaged into each other and/or turned out of each other at least by a turning movement. Whether or not in combination therewith, the profiles at the edges 8-9 also can be configured such that two of such panels can be engaged into each other by means of a shifting and snap movement. This, too, can be in combination with any one of the aforementioned aspects of the invention.

Further, it is also clear that in all coupling parts which are applied in panels according to the invention, a so-called pretension can be incorporated, by which the panels in coupled condition are tensioned towards each other and adjoin well against each other. The basic principle of pretension as such is known from WO 97/47834.

Further, it is clear that the flexible part 31 can be configured such that the part 18, in coupled condition, is pressed with its contact surfaces 29 with a permanent force onto the contact surfaces 30.

For clarity's sake, it is noted that, when it is stated that the flexible part is bendable "in the plane of the panel", a bending will occur seen in a theoretical plane of section parallel to the plane of the panel. This does not necessarily mean that the flexible part as such is movable in horizontal direction. In the embodiment of FIG. 5, the flexible part in fact performs a tilting and bending movement and thus substantially is not displaced horizontally, but rotates.

By a "downward movement", it is meant that in a cross-section as in FIGS. 4 to 6, the one panel in respect to the other moves with the hook-shaped parts with their open sides towards each other. This can be in a substantially plane-parallel manner, however, also as a result of applying the aforementioned "angle-push" technique. Also, it is noted that the downward movement can or cannot take place with a minimal displacement in transverse direction, thus, horizontally in FIG. 5, as a result of mutual lateral contacts.

Although otherwise represented in the figures, it is not excluded that the underlying layer 46 may extend to below the synthetic edge parts 10A. In the figures, it is further also represented that, according to these examples, the synthetic edge part 10A extends at least over the entire thickness of the core material. Hereby, by means of the synthetic edge part a waterproof protection of the core 10 is obtained. The entire contour of the respective coupling parts 14 is performed in the material of this edge part 10A.

FIG. 17 further also shows that a synthetic edge part 10B can also be provided on the opposite edge 4. In this case, an edge part 10B is applied, wherein the connection between the edge part 10B and the core material 10 is over a boundary surface having partial surfaces 48, which extend transverse to the normal of the surface of the panel 1.

Figure 18:
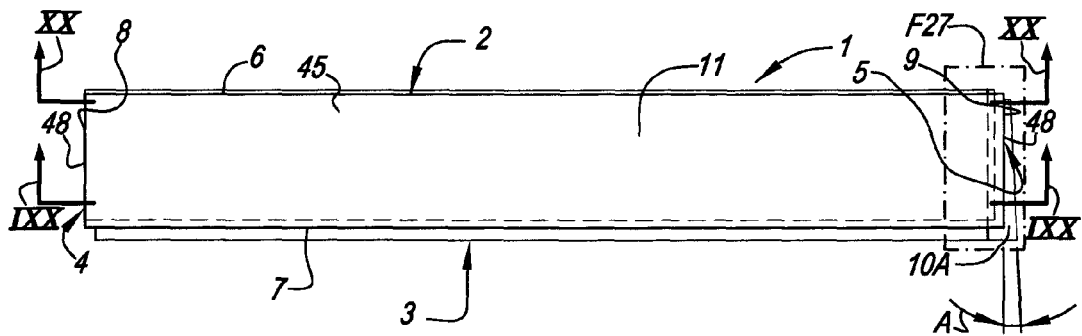
FIG. 18 represents a particular variant of the invention and also illustrates the characteristics of the first aspect of the invention.
Figure 19:
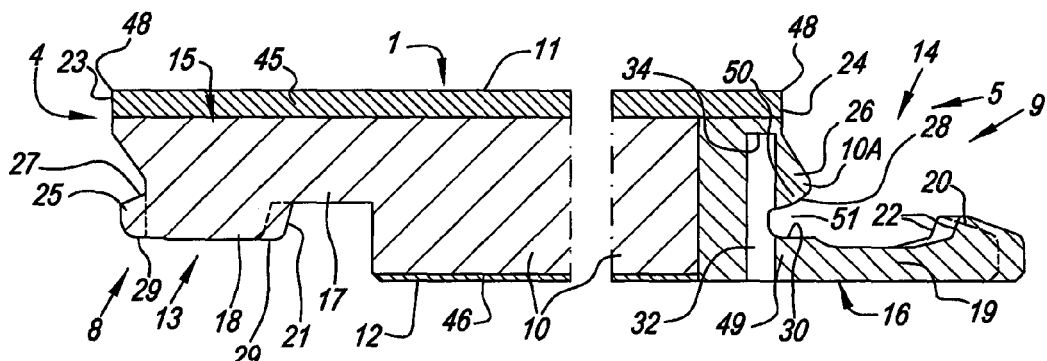
FIGS. 19 and 20, at a larger scale, represent cross-sections respectively of the lines IXX-IXX and XX-XX represented in FIG. 18.
Figure 20:
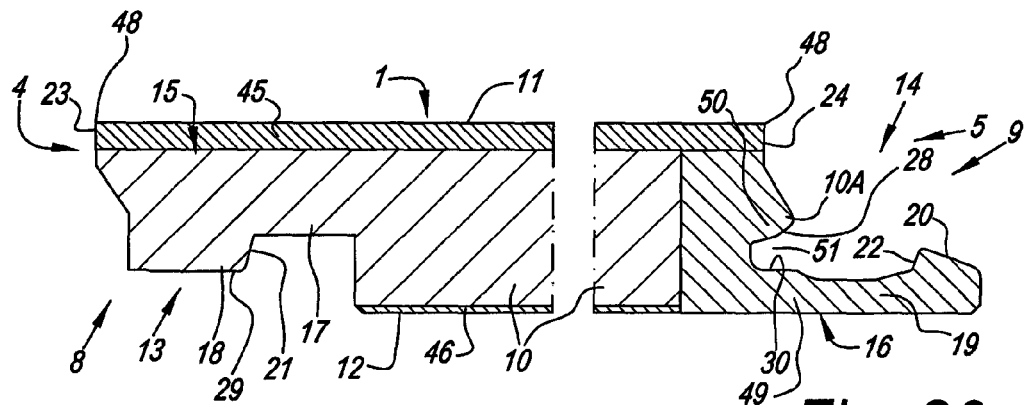

FIGS. 18 to 20 represent another particular variant of the second aspect of the present invention, wherein the characteristics of the first aspect have been applied as well, namely, wherein said coupling parts 13-14 for providing said locking in the plane of the panels 1 and perpendicular to said edges 8-9 are provided with locking parts in the form of hook-shaped parts 15-16, which, in the coupled condition, show contact surfaces 21-22 engaging behind each other, with the particular characteristic that these contact surfaces 21-22, seen in this top plan view of the panel 1, globally extend in a direction different from the direction of said upper edges 48.

It is evident that the particular characteristic illustrated by means of FIGS. 18 to 20 can also be applied broader than only with panels showing the characteristics of the second aspect of the aforementioned invention. To wit, this relates to an illustration of the first aspect of the invention, which, as mentioned in the introduction, has to be understood in its broadest sense as a panel, more particularly a floor panel, wherein this panel 1 comprises a core 10, an upper side 11, a lower side 12 and at least two opposite edges 8-9, wherein the panel at said edges 8-9 comprises pertaining upper edges; wherein at said two opposite edges 8-9, coupling parts 13-14 are provided; wherein these coupling parts 13-14 have such a configuration that the coupling parts of two of such panels 1 can be brought into each other by means of a downward movement of one of the panels 1 in respect to the other, wherein, in the coupled condition of the panels 1, a locking can be obtained in the plane of the panels 1 and perpendicular to said edges 8-9, as well as perpendicular to the plane of the panels 1, wherein said coupling parts 13 for providing said locking in the plane of the panels 1 and perpendicular to said edges 8-9 are provided with locking parts in the form of hook-shaped parts 15-16, which, in the coupled condition, show contact surfaces 21-22 engaging behind each other, with the characteristic that these contact surfaces 21-22, seen in a top plan view of the panel 1, globally extend in one or more directions different from the direction of said upper edges. This particularity can lead to an improved tensioning among the panels 1, whereas the panels 1 possibly still can be detached in a smooth manner. This is of particular importance with coupling parts or coupling means which can be engaged in each other by means of a downward movement. To wit, the systems of the state of the art often are provided with a certain play in the direction of the plane and perpendicular to the coupled edges, such that they can be brought into each other in a smooth manner. Hereby, gaps in the floor surface may occur. The deviating direction of the contact surfaces 21-22, which is applied according to the present particular aspect, can result in a more accurate coupling, for example, without play, whereas the coupling parts still can be brought into each other in a smooth manner. The first independent aspect further has the advantage that, compared with existing downward-coupling systems, can be marketed in a more economic manner.

According to preferred embodiments of the aforementioned particular independent aspect, said hook-shaped parts 15-16, on the one hand, comprise an upper hook-shaped part 15 with a flange 17 laterally protruding near the upper side of the panel 1, which flange is provided with a downward-directed part 18, and, on the other hand, a lower hook-shaped part 16 with a flange 19 laterally protruding near the lower side of the panel 1, which flange is provided with an upward-directed part 20, wherein said contact surfaces 21-22 are formed between said downward-directed part 18 and said upward-directed part 20. FIGS. 18 to 20 illustrate such embodiment. Preferably, said contact surfaces 21-22, such as here, seen in a cross-section perpendicular to the respective edge, extend vertically or extend inclined or bent from the top to the bottom in the direction of the edge provided with the lower hook-shaped part 16.

Preferably, the coupling parts 13-14, according to the first independent aspect, comprise locking parts 25-26 on said two edges 8-9, which locking parts ensure said locking in the direction perpendicular to the plane of the panels 1, wherein these locking parts 25-26 comprise respective contact surfaces 27-28. Preferably, these locking parts 25-26, just as in the present examples, are substantially formed as a tongue or tongue-shaped part 25 and a groove 51 bordered by a lower lip 49 and an upper lip 50. In the case of FIGS. 18 to 20, the lower lip 49 is determined by the lower hook-shaped part 16, whereas the upper lip 50 for the major part is determined by the locking part 26.

As in the preceding case, said contact surfaces 27-28 preferably are situated on the upper side of said tongue or tongue-shaped part 25 and on the lower side of said upper lip 50.

Said contact surfaces 27-28 provided on the locking parts 25-26, which provide for said locking in the direction perpendicular to the plane of the panels 1, preferably, as is also the case in the examples, extend substantially parallel to the upper side of the panels.

Preferably, said contact surfaces 21-22, seen in a top plan view of the panel 1, globally extend in a direction forming an angle A with the upper edges 48, wherein this angle A is situated between 0.5° and 5°, and still better between 1° and 2°.

Preferably, said contact surfaces 21-22, seen in a top plan view of the panel 1, as is the case here, globally extend on a straight line forming an angle A with the upper edge 48 of the panels 1.

Preferably, the panels 1 of the first independent aspect further are characterized in that the panels 1, on the other pair of opposite sides 6-7, also are provided with coupling means 39-40 allowing to couple two of such panels 1 on these edges by engaging the respective coupling means 39-40 in each other, wherein these coupling means 39-40 comprise a female coupling part and a male coupling part, and during coupling the male coupling part has to be provided in the female coupling part. For example, this may relate to a male coupling part 39 and a female coupling part 40, which respectively are substantially realized as a tongue and a groove, as this is the case with the coupling means of FIG. 12. Preferably, these coupling means 39-40 allow that two of such panels 1 can be engaged in each other at least by means of a turning movement W.

As illustrated by the example of FIG. 18, the panels preferably also have the further characteristic that said contact surfaces 21-22, seen in a top plan view of the panel 1, globally extend from said male coupling part 39 to the female coupling part 40 in a direction away from the edge 5 which is provided with the lower hook-shaped part 16. Preferably, the distance between said contact surfaces 21-22 and the respective upper edge 48 is increasing. These embodiments allow a smooth uncoupling of the coupled panels 1. Uncoupling the panels can be performed by turning the panel 1 upward, along the coupled long edge 6, which is provided with the male coupling part 39, in combination with a limited displacement of the panels 1 along the edges 4-5 and away from the coupled long edge 6. Of course, it is not excluded that said contact surfaces 21-22, seen in a top plan view of the panel 1, globally extend from said male coupling part 39 to the female coupling part 40 in a direction towards the edge 5, which is provided with the lower hook-shaped part 16. Preferably, the distance between said contact surfaces 21-22 and the respective upper edge 48 in such case is getting smaller. Such embodiment also allows smooth uncoupling. In this case, uncoupling, according to a first possibility, can be performed by turning up one or more panels 1 in a row at the same time in order to detach these panels 1 at the long edges 6 provided with the male coupling part 39, from an adjacent row and afterwards displacing the panels along the edges 4-5 and towards the coupled long edge 6. According to a second possibility, detaching can be performed by turning up the panel 1 along the coupled long edge 7, which is provided with the female coupling part, in combination with a limited displacement of the panels 1 along the edges 4-5 and away from the coupled long edge 7 which is provided with the female coupling part. Of course, other assembling or disassembling techniques are not excluded. In general, it can be said that the panels 1 preferably can be uncoupled by turning up on a long edge in combination with the displacement on a short edge in the direction of the increasing distance between the contact surfaces 21-22 and the upper edges 48.

It is clear that the independent first aspect of the present invention can be applied with the panels showing the characteristics of the second aspect of the invention mentioned in the introduction, namely with panels 1 which, as in the examples of FIGS. 18 to 20, show, on at least one of said opposite edges 8-9, a synthetic edge part 10A, of a material different from the core material, wherein the coupling parts 13-14 at said two edges 8-9 comprise locking parts 25-26 ensuring said locking in the direction perpendicular to the plane of the panels 1, wherein at least one of these locking parts 26 forms part of a flexible part 31 realized in one piece with said synthetic edge part, which flexible part extends along the respective edge and is bendable at least in the plane of the panel, as the consequence of joining two of such panels 1. According to an alternative, the core material extends up to the respective edge with the locking part 26, and possibly the edge itself is free from synthetic edge portions of another material, wherein the respective locking part 26 then forms part of a flexible part formed in one piece with the core material. Herein, then also possible support parts and other locking parts at the respective edges preferably are realized in one piece in the core material, wherein preferably for the core material use is made of a board-shaped substrate of a wood composite, such as MDF or HDF. Preferably, said flexible part 31 is realized as a lip 26, whereas another locking part 25, which is intended for cooperating therewith, is realized as a tongue-shaped part 25, which, during joining of two of such panels 1, causes an elastic bending in the lip 26, such that this tongue-shaped part 25 can become engaged behind the lip 26 by means of a snap movement. In particular, the coupling means from PCT/IB2010/052812 can be applied.

Figure 21:
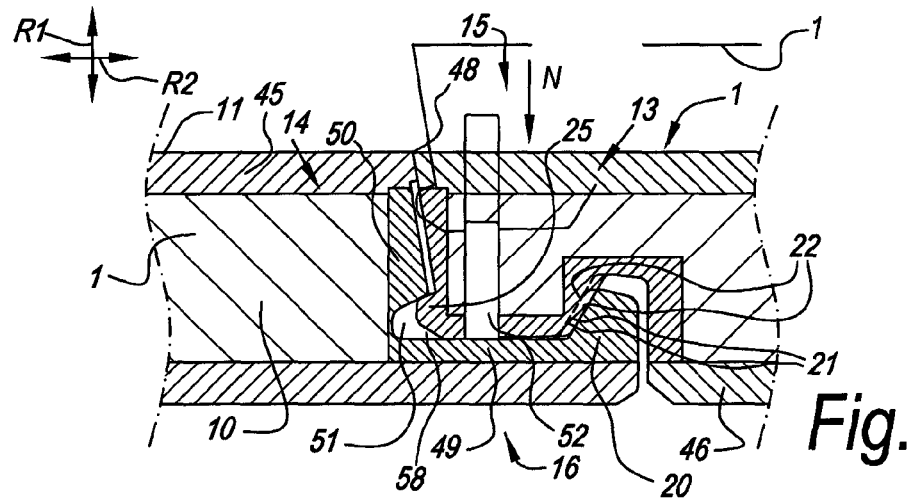
FIGS. 21 and 22 represent variants in a view similar to that of FIG. 6.

FIG. 21 represents another example of said first independent inventive aspect, wherein the floor panel 1 at the short pair of edges 4-5 is provided with coupling means 13-14 which allow a coupling by means of a downward movement N of the coupling means at the one edge 4 in the coupling means at the other edge 5. Herein, the coupling means 13-14 are realized with locking parts 25-26, which substantially are formed as a tongue or tongue-shaped part 26 and a groove 51 bordered by a lower lip 49 and an upper lip 50. Herein, the lower lip 49 is determined by the lower hook-shaped part 16, whereas the upper lip 50 is determined by an undercut provided on the edge 5 which is provided with the lower hook-shaped part 16. The tongue-shaped part can be provided in the groove 51 by means of said downward movement N. Said tongue-shaped part 25 is made movable and cooperates with said groove 51 in order to provide for a locking in the direction perpendicular to the plane of the coupled panels 1. In this case, the movable tongue-shaped part 25 is situated on the upper hook-shaped part 15, and said groove 51 is provided on the lower hook-shaped part 16. However, it is not excluded that this may be realized vice versa. In this case, the movability of the tongue part 25 is at least partially obtained by means of a free space 52 provided behind the tongue part 25, by which this tongue part 25, with coupling in proximal direction, can be moved in respect to the edge 4 on which it is situated. After the end of the coupling movement N, the tongue part 25 enters said groove 51. Instead of working with a tongue part 25 which automatically ends up in said groove 51 when performing the coupling movement N, also a tongue part 25 can be used which still requires a separate operation for obtaining an effective locking in the direction perpendicular to the plane of the coupled panels 1. For example, it is possible that such tongue part 25, after performing the downward movement N, still has to be displaced in a direction parallel to the edges 4-5 to be coupled. This can be performed, for example, by the installing person, or by the intermediary of a panel 1 still to be installed, for example, in a subsequent row. Such coupling means 13-14 are known as such, for example, from WO 2009/116926.

Figure 22:
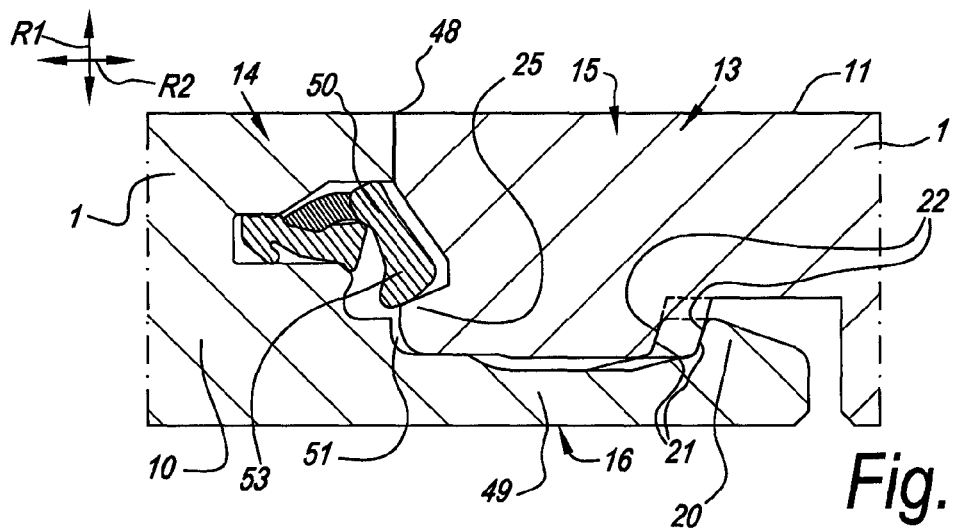

It is noted that according to this first aspect of the invention, preferably coupling means 13-14 are used which are made in one piece in the substrate material 10 and/or the material of a possible synthetic edge part 10A-10B. However, it is not excluded that separate material parts may be used which form part of the coupling means. For example, in the case of coupling means which allow a coupling by means of a downward movement, use can be made of a tongue part 25 consisting of one or more plastic strips 53, which are provided in a recess provided for this purpose. An example thereof is illustrated by means of FIG. 22. In the example of FIG. 22, the strip 53 provides for the snap effect which provides for the automatic locking of the floor panels in the direction perpendicular to the plane of the coupled panels 1.

Where in the above description a downward coupling movement is mentioned, this preferably relates to a coupling movement obtained by means of a turning movement W along the long pair of edges 6-7. As mentioned, it is not excluded that the downward coupling movement still has to be completed by means of a separate operation for realizing an effective locking in the direction perpendicular to the plane of the coupled panels 1. It is noted that said first independent inventive aspect preferably is applied for coupling means which, when the floor panels are coupled to each other with a downward movement, automatically result in a locking in the plane of the panels 1 and perpendicular to said edges 8-9 as well as perpendicular to the plane of the panels 1. For example, use can be made of coupling means which, during joining, provide for a snap effect. Namely, the deviating direction of the contact surfaces 21-22 can lead to a more gradual snap effect of the locking parts during the downward joining movement or coupling movement. However, the aspect can also be applied with coupling means which, after being joined, require a separate operation for obtaining the final locking in the direction perpendicular to the plane of the panels 1.

Figure 23:
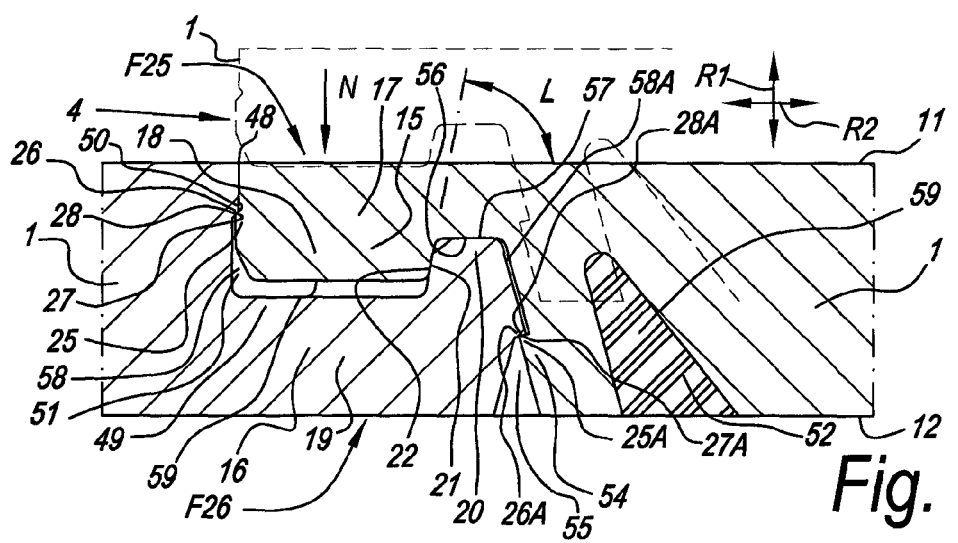

FIG. 23 shows another example of coupled floor panels 1 with the characteristics of the first aspect of the invention. To this aim, the panels 1, for providing the locking in a direction R1 in the plane of the panels 1 and perpendicularly to the respective edges 4-5, in this case the short edges 4-5 of an oblong floor panel 1, are provided with hook-shaped parts 15-16, which in the coupled condition represented here show contact surfaces 21-22 which engage one behind the other.

FIG. 24 clearly shows that the contact surfaces 21-22 extend in one or more directions differing from the direction of the upper edges. This is also clear from FIGS. 25 and 26, which respectively offer a top view on the lower hook-shaped part 16 and a bottom view on the upper hook-shaped part 16.

Said upper hook-shaped part 15 comprises a flange 17 laterally protruding near the upper side of the panel 1, which flange is provided with a downward-directed part 18. Said lower hook-shaped part 16 comprises a flange 19 laterally protruding near the lower side of the panel 1, which flange is provided with an upward-directed part 20. Said contact surfaces 21-22 are formed between said downward-directed part 18 and said upward-directed part 20. The respective contact surface 22 formed on the upward-directed part 20 is oriented towards the pertaining upper edge. Viewed in the cross-section of FIGS. 23 and 24, the contact surfaces 21-22 extend inclined from the top downward in the direction of the edge provided with the lower hook-shaped part 16. In this case, an angle L situated between 35 and 80° is applied. Preferably, the angle L is at least 45° or 50°. Independent from the direction or directions in which the contact surfaces 21-22 extend along the edges 4-5, the inclination, or the angle L, preferably remains constant. If the inclination, or the angle L, varies along the edges 4-5, preferably it will still remain situated between 35 and 80° at each point along the edges 4-5.

The coupling parts or hook-shaped parts 15-16 further also comprise locking parts 25-26, which ensure said locking in a direction R1, perpendicularly to the plane of the coupled panels 1. These locking parts 25-26-25A-26A also show cooperating contact surfaces 27-28-27A-28A, which resist the release of the upper hook-shaped part 15 from the lower hook-shaped part 16 in said direction R1. In the example, the contact surfaces 27-28-27A-28A extend in a flat manner, however, respectively at an angle with the surface of the panels 1, for example, such as here, at an angle of 45° or less.

In the examples of the FIGS. 23 through 26, the locking parts 25-26-25A-26A and contact surfaces 27-28-27A-28A are made double. The first pair of locking parts 25-26 is substantially formed as a tongue 25 and a groove 51 bordered by a lower lip 49 and upper lip 50. The pertaining contact surfaces 27-28 are situated on the upper side of the tongue 25 and on the lower side of said upper lip 50 and in this case extend flat at an angle of 45°, or approximately 45°, with the surface of the panels 1. The second pair of locking parts 25A-26A and contact surfaces 27A-28A substantially is formed as a lateral protrusion 54, namely protruding in the direction R2, at the lower side of the edge 4 with the upper hook-shaped part 15, and an undercut 55 on the lower side of the lower hook-shaped part 16, wherein the protrusion 54 and the undercut 55 cooperate with each other and form contact surfaces 27A-28A active in said direction R1. The respective contact surfaces 27A-28A are formed more particularly on the upper side of the protrusion 54 and on the lower side of the lower hook-shaped part 16, at the location of the recess 55. The respective contact surfaces 27A-28A extend flat at an angle of 15° or approximately 15° to the surface of the panels 1.

Although in the present example the locking parts 25-26-25A-26A and the pertaining contact surfaces 27-28-27A-28A are made double, it is not excluded that one would work with only one pair of these locking parts and contact surfaces, either with said first pair or with said second pair.

In the example of FIGS. 23 through 26, also vertically active contact surfaces 56-57 are provided, which restrict the movement of the upper hook-shaped part 15 towards the lower hook-shaped part 16. In the example, these contact surfaces 56-57 respectively are situated on the lower side of the upper hook-shaped part 15 and on the upper side of the upward-directed part 20 of the lower hook-shaped part 16. Such contact surfaces 56-57, which restrict the movement of the upper hook-shaped part 15 towards the lower hook-shaped part 16, in general are of interest for minimizing the risk of the occurrence of height differences between the coupled upper edges when the floor covering is walked on and may be applied in any embodiment of said first aspect and/or said second aspect of the invention.

Further, in the example of FIGS. 23 through 26, in coupled condition of two floor panels, a space 58 is provided between the lower side of the upper hook-shaped part 15 and the upper side of the lower hook-shaped part 16, wherein this space 58 extends at least vertically underneath the coupled upper edges. Such space 58 in general is of interest for minimizing the risk of the occurrence of height differences between the coupled upper edges and may be applied in any embodiment of said first aspect and/or said second aspect of the invention. Preferably, the space 58 extends over at least a third of the recess 59 or over at least the major part of the recess 59, or, such as here, over the entire recess 59 adjacent to the upward-directed part 20 of the lower hook-shaped part 16, namely at least from vertically underneath the coupled upper edges up to the contact surfaces 21-22 active for the locking in the horizontal direction R2. On the distal end of the upward-directed part 20, further also a space 58A is provided. In this case, contacts between this distal end and the upper hook-shaped part 15 and/or lateral protrusion 54, with the exception of the contact surfaces 27A-28A, are avoided, such that a good connection with the upper edges 48 can be obtained.

FIGS. 23 through 26 further also show that for the lateral protrusion 54, use is made of a movably provided part of the panel 1, similar to the tongue-shaped part 25 from FIG. 21. Instead of working with a groove, the movably realized lateral protrusion 54 here, as aforementioned, works in conjunction with the undercut 55. The movability of the lateral protrusion 54 in this case is obtained at least partially in that a flexible material 59 is applied in an initially free space 52 behind the lateral protrusion, whereby this protrusion 54, during coupling, can be moved in proximal direction in respect to the edge 4 on which it is located. Towards the end of the coupling movement N, the lateral protrusion 54 enters the undercut 55. Instead of working with a protrusion 54 which automatically enters the undercut 55, here, too, one may work with a lateral protrusion which still requires a separate operation for obtaining an effective locking in the direction perpendicular to the plane of the coupled panels 1. It is also noted that for the flexible material 59, use can be made of the materials mentioned in WO 2010/142671, for example, of a material chosen from the series of silicone, acrylate, hot-melt glue, whether or not foamed, for example, on the basis of polyurethane. Further, it is noted that such flexible material 59 can also be applied in the free space 52 of the example of FIG. 21, or in any other coupling where movability of a locking part is obtained by means of a free space, for example, in the embodiments of the second aspect, in the cut 32. Further, it is clear that the flexible material 59 in the examples of the FIGS. 23 through 26 has to be considered as purely optional and that, for example, also an effectively free space 52 might be employed.

Further, it is also noted that the hook-shaped parts 15-16 including the locking parts 25-26-25A-26A and contact surfaces 27-28-27A-28A are made in one piece with the panel 1, for example, in one piece with the core 10 of such panel 1. However, it is not excluded that one or more of these parts and/or surfaces might be formed on a separate edge part fixedly connected to the panel and/or on a separate strip connected to the panel in a removable manner. For example, the lateral protrusion 54 from FIGS. 23 through 26 can be made by means of a springy, or arranged in a springy manner, plastic strip, similar to the plastic strip 53 of FIG. 22.

FIG. 27 again clearly shows the configuration of the contact surface 22, according to the most preferred embodiment of the invention according to its first aspect. Herein, the contact surface 22 extends at an angle A with the upper edge 48, wherein this angle A is situated between 0.5 and 5°, in the example, approximately 3° has been chosen for this angle A. Viewed in the top view of this example, the contact surfaces extend continuously according to a straight line over an operative distance D of more than 50% or here of even more than 75% of the width B of the decorative side of the panel 1. Also in the case of not-continuous contact surfaces and/or of not straight and thus curved contact surfaces, the overall operative distance D of the contact surfaces preferably is maintained. By "operative distance D" is meant that in a coupled condition of two panels 1 effectively a contact is created over this distance D.

In the example of FIG. 27, the panel 1 at the other pair of opposite sides 2-3 is also provided with profiled edges 6-7 with a male coupling part 39 and a female coupling part 40. Preferably, this relates to coupling parts 39-40 similar to those described by means of FIG. 12, whereby they allow connecting two panels 1 at the respective sides 2-3 with each other by means of a turning movement W. It is clear that herein not necessarily a covering layer 47 has to be applied. The contact surface 21 herein extends such that the distance between the upper edge 48 and the contact surface 22, viewed in the direction of the male coupling part 39 towards the female coupling part 40, always increases.

Although in the preceding figures always represented as straight and continuous, it is not excluded that the contact surfaces 21-22, according to the first independent inventive aspect, are realized curved and/or discontinuous.

FIG. 28 represents an example of contact surfaces which are interrupted and wherein the actual contact surface 22 consists of two parts, which both extend in the same direction, however, different to the pertaining upper edge 48. Of course, it is not excluded that the parts might extend in a mutually different direction. In this case, the distance D1 between the upper edge 48 and the contact surface 22 increases for both parts thereof in the same direction. Preferably, the contact surfaces 21-22 of both parts together, in case of an interruption thereof, such as here, extend over an overall operative distance D of more than 30% or here even of more than 50%, or almost 60% of the width B of the decorative side of the panel 1. Also in the case that there should be more than two parts, the common operative distance D of all of these parts preferably is more than 30% or more than 50% of the width B of the decorative side of the panel 1.

FIG. 29 represents an example of contact surfaces 22 which are interrupted and wherein both parts of the actual contact surface 22 extend in a curved manner along the pertaining upper edge 48. Here, too, the distance D1 between the upper edge 48 and the contact surface 22 each time increases or possibly locally remains the same. In this case, a continuous, however, not constant curvature is applied. Here, too, the common operative distance D over which the contact surfaces 22 extend is more than 30% or even more than 50% of the width B of the decorative side of the panels 1. In dashed line 60, another variant is represented, wherein one of the parts of the contact surfaces 22 extends such that the distance D1 between the contact surface 22 and the upper edge 48 increases in reverse direction along the upper edge 48 in comparison to the other part. In this manner, for example, a centering effect can be obtained of the long sides 2-3 of two coupled panels 1.

It is evident that in the examples of FIGS. 27 to 29 preferably corresponding contact surfaces 21 are applied, to wit with substantially coinciding interruptions and/or directions and/or parts.

When an interruption of the contact surface in different parts is mentioned, this respectively relates to an interruption of the contact itself in a coupled condition of two of such panels, and not necessarily to an interruption of the part of the coupling parts on which such contact surface is provided.

FIG. 28 in dashed line represents another embodiment where plastic strips 53 are applied, for example, similar to those represented and/or described in connection with FIG. 22. Of course, such strip 53 can be applied in any embodiment of the first aspect of the invention, preferably for realizing contact surfaces 27-28 which are operative in vertical direction R1, perpendicularly to the plane of the coupled panels 1. Such strip 53 preferably leads to the creation of a snap effect when performing the coupling movement N. Preferably, by means of such strip 53 and/or snap effect, an automatic locking is obtained in the direction perpendicularly to the plane of the coupled panels 1. A particularity of the embodiment of FIG. 28 is that along the respective edge 5 a plurality of such strips 53 are used, in this case two strips 53. In this case, the position of the strips 53 corresponds to the parts of the contact surface 21. By working with more than one strip, a more gradual coupling can be obtained, which can be provided in each other with less force exertion by means of a downward coupling movement N of the panels towards each other. However, it is not excluded that one or more strips 53 might be applied, whereby the position thereof corresponds to one or more interruptions in the contact surface 21, or only one strip 53, which then preferably extends over at least 50 percent of the width B of the decorative side.

It is clear that the core materials, synthetic edge parts and materials therefor, top layers and backing layers mentioned in the introduction can be applied in the first as well as in the second independent inventive aspect.

It is also noted that in the above description and the following claims, a number of terms, such as "downward", "lower", "upper", "lower side" and "upper side", are related to floor panels and that it is clear that for other panels, which are not lying substantially flat, these terms have to be interpreted similarly, however, then relative to the plane of the panels.

The present invention is in no way limited to the embodiments described by way of example and represented in the figures; on the contrary, such panels may be realized in various forms and dimensions without leaving the scope of the present invention. So, for example, the invention is not limited to floor panels and can be employed in any other field of application, such as, amongst others, in wall panels, ceiling panels, furniture panels and so on.

The invention claimed is:

1. A floor panel, comprising:
   a core,
   an upper side,
   a lower side and
   at least two opposite edges,
   wherein the panel at said edges includes upper edges;
   wherein coupling parts are provided on said two opposite edges;

wherein said coupling parts have such a configuration that the coupling parts of a first of such panels can be brought into the coupling parts of a second of such panels by means of a downward movement of the first of such panels in respect to the second of such panels, wherein, in the coupled condition of the first of such panels and the second of such panels, a locking can be obtained in a first direction and a second direction, the first direction being within the plane of the panels and perpendicular to said edges and the second direction being perpendicular to the plane of the panels, wherein said coupling parts for providing said locking in the first direction are provided with locking parts in the form of hook-shaped parts showing, in the coupled condition, contact surfaces which prevent movement apart of the panels in the first direction by engaging behind each other such that in the coupled condition a contact surface of the second panel is arranged in contact with a contact surface of the first panel, the contact surface of the second panel being locked in the coupled condition between the contact surface of the first panel and a core of the first panel, the contact surfaces providing said locking in the first direction by mutually exerting a horizontal locking force at least partially in the first direction, wherein said contact surfaces, seen in a top plan view of the panel, extend generally in an angled direction along a length of said opposite edges, the angled direction being within a plane parallel to the plane of the panels, but the angled direction is skewed from the direction of said upper edges.

2. The floor panel of claim 1, wherein said hook-shaped parts comprise an upper hook-shaped part with a flange laterally protruding near the upper side of the panel, said flange being provided with a downward-directed part, and a lower hook-shaped part with a flange laterally protruding near the lower side of the panel, said flange being provided with an upward-directed part, wherein said contact surfaces are formed between said downward-directed part and said upward-directed part.

3. The floor panel of claim 2, wherein said contact surfaces, seen in a cross-section perpendicular to the respective edge, extend vertically or extend inclined or bent from the top to the bottom in the direction of the edge provided with the lower hook-shaped part.

4. The floor panel of claim 1, wherein said locking parts ensure said locking in the direction perpendicular to the plane of the panels.

5. The floor panel of claim 4, wherein said locking parts, which ensure said locking in the direction perpendicular to the plane of the panels, substantially are formed as a tongue and a groove bordered by a lower and upper lip.

6. The floor panel of claim 5, wherein said contact surfaces are situated on the upper side of said tongue and on the lower side of said upper lip.

7. The floor panel of claim 1, wherein said angled direction, seen in a top plan view of the panel, extends in a direction forming an angle between 0.5° and 5° with the upper edges.

8. The floor panel of claim 1, wherein said contact surfaces, seen in a top plan view of the panel, extend in the angled direction on a straight line.

9. A floor panel, comprising:
a core,
an upper side,
a lower side and
at least two opposite edges;

wherein coupling parts are provided on said two opposite edges;

wherein said coupling parts have such a configuration that a first of such panels can be coupled to a second of such panels by means of a downward movement of the first of such panels in respect to the second of such panels, such that, in the coupled condition of the first of such panels and the second of such panels, a locking is obtained in a first direction and a second direction, the first direction being within the plane of the panels and perpendicular to said edges and the second direction being perpendicular to the plane of the panels, wherein the panel, at least at one of said opposite edges, comprises a synthetic edge part of a material different from the core material, wherein the coupling parts on said two edges comprise locking parts ensuring said locking in the second direction, said locking parts being in the form of hook-shaped parts showing, in the coupled condition, contact surfaces which prevent movement apart of the panels in the first direction by engaging behind each other such that in the coupled condition a contact surface of the second panel is arranged in contact with a contact surface of the first panel, the contact surface of the second panel being locked in the coupled condition between the contact surface of the first panel and a core of the first panel, the contact surfaces providing said locking in the first direction by mutually exerting a horizontal locking force at least partially in the first direction, wherein at least one of these locking parts forms part of a flexible part made in one piece with said synthetic edge part and extending along the respective edge and being bendable at least in the plane of the panel, as a result of the joining of two of such panels, and wherein said contact surfaces, seen in a top plan view of the panel, extend generally in an angled direction along a length of said opposite edges, the angled direction being within a plane parallel to the plane of the panels, but the angled direction is skewed from the direction of said upper edges.

10. The floor panel of claim 9, wherein said flexible part is made as a lip, whereas another of said locking parts, which is intended for cooperating therewith, is made as a tongue-shaped portion, which, during connecting two of such panels, causes an elastic bending in the lip, such that this tongue-shaped portion can become engaged behind the lip by means of a snap movement.

11. The floor panel of claim 9, wherein said flexible part is suspended such that, apart from a bending in the plane of the panel, it also performs a tilting movement and/or torsional movement.

12. The floor panel of claim 9, wherein said locking parts are formed by parts which engage behind each other by means of a snap movement.

13. The floor panel of claim 9, wherein the panel comprises at least one support part which, with two of such coupled panels, when exerting a force in a direction opposed to said downward movement, forms a support against bending of the flexible part in a direction transverse to the plane of the coupled panels.

14. The floor panel of claim 9, wherein said flexible part is made as a lip, whereas another locking part, which is intended for cooperating therewith, is made as a tongue-shaped portion, which, during connecting two of such panels, causes an elastic bending in the lip, such that this tongue-shaped portion can get seated behind the lip by means of a snap movement.

15. A floor panel, comprising:
a core,
an upper side,
a lower side and
at least two opposite edges,
wherein the panel at said edges includes upper edges;
wherein coupling parts are provided on said two opposite edges;
wherein said coupling parts have such a configuration that the coupling parts of a first of such panels can be brought into the coupling parts of a second of such panels by means of a downward movement of the first of such panels in respect to the second of such panels,
wherein, in the coupled condition of the first of such panels and the second of such panels, a locking can be obtained in a first direction and a second direction, the first direction being within the plane of the panels and perpendicular to said edges and the second direction being perpendicular to the plane of the panels,
wherein said coupling parts for providing said locking in the first direction are provided with first locking parts in the form of hook-shaped parts showing, in the coupled condition, contact surfaces which engage behind each other such that in the coupled condition a contact surface of the second panel is arranged in contact with a contact surface of the first panel, the contact surface of the second panel being locked in the coupled condition between the contact surface of the first panel and a core of the first panel, the contact surfaces providing said locking in the first direction,
wherein said coupling parts for providing said locking in the second direction are provided with second locking parts which prevent movement apart of the panels in the second direction, the contact surfaces being separate from any portions of the second locking parts,
wherein said contact surfaces, seen in a top plan view of the panel, extend generally in angled direction along a length of said opposite edges, the angled direction being within a plane parallel to the plane of the panels, but the angled direction is skewed from the direction of said upper edges.

16. A floor panel, comprising:
a core,
an upper side,
a lower side and
at least two opposite edges,
wherein the panel at said edges includes upper edges;
wherein coupling parts are provided on said two opposite edges;
wherein said coupling parts have such a configuration that the coupling parts of a first of such panels can be brought into the coupling parts of a second of such panels by means of a downward movement of the first of such panels in respect to the second of such panels,
wherein, in the coupled condition of the first of such panels and the second of such panels, a locking can be obtained in a first direction and a second direction, the first direction being within the plane of the panels and perpendicular to said edges and the second direction being perpendicular to the plane of the panels,
wherein said coupling parts for providing said locking in the first direction are provided with first locking parts in the form of hook-shaped parts showing, in the coupled condition, contact surfaces which prevent movement apart of the panels in the first direction by engaging behind each other such that in the coupled condition a contact surface of the second panel is arranged in contact with a contact surface of the first panel, the contact surface of the second panel being locked in the coupled condition between the contact surface of the first panel and a core of the first panel, the contact surfaces providing said locking in the first direction,
wherein said first locking parts substantially are formed as a tongue and a groove, the groove being bordered by an upper lip and a lower lip, wherein the contact surface of the first panel is formed at a distal end of the lower lip, and
wherein said contact surfaces, seen in a top plan view of the panel, extend generally in angled direction along a length of said opposite edges, the angled direction being within a plane parallel to the plane of the panels, but the angled direction is skewed from the direction of said upper edges.

\* \* \* \* \*